United States Patent [19]

Nahm et al.

[11] 3,956,140

[45] May 11, 1976

[54] DRILLING FLUIDS

[75] Inventors: James Jang Woo Nahm; David A. Rowe, both of Houston, Tex.

[73] Assignee: Dresser Industries, Inc., Dallas, Tex.

[22] Filed: Apr. 27, 1973

[21] Appl. No.: 355,153

Related U.S. Application Data

[63] Continuation-in-part of Ser. No. 60,637, Aug. 3, 1970, abandoned.

[52] U.S. Cl. .................... 252/8.5 C; 252/8.5 A; 252/8.55 R; 252/353; 260/17.5; 260/29.3; 260/49
[51] Int. Cl.² ......................................... C09K 7/02
[58] Field of Search ......... 252/8.5 A, 8.5 C, 8.55 R, 252/353

[56] References Cited
UNITED STATES PATENTS

| | | | |
|---|---|---|---|
| 2,331,281 | 10/1943 | Wayne | 252/8.5 |
| 2,560,380 | 7/1951 | Wrightsman | 252/8.5 |
| 2,681,312 | 6/1954 | Salathiel | 252/8.5 |
| 2,935,504 | 5/1960 | King et al. | 260/124 |
| 3,095,392 | 6/1963 | Herrick | 252/8.5 X |
| 3,325,426 | 6/1967 | Markham | 252/8.5 X |
| 3,352,902 | 11/1967 | Moschopedis | 260/507 |
| 3,700,728 | 10/1972 | Moschopedis et al. | 252/8.5 X |
| 3,766,229 | 10/1973 | Turner et al. | 260/429 |

OTHER PUBLICATIONS

Tishchenko et al., Article in Journal of Applied Chemistry of the U.S.S.R., Vol. 35, No. 3, Mar. 1962, pp. 611–619.

*Primary Examiner*—Herbert B. Guynn
*Attorney, Agent, or Firm*—Raymond T. Majesko; John N. Hazelwood

[57] ABSTRACT

Well drilling, workover and completion fluids containing various water soluble condensation products of phenolic materials, formaldehyde and sulfite salts. Such condensation products may be further modified by including during the condensation reaction one or more of urea, melamine, salicylic acid, benzoic acid, phthalic acid, adipic acid, succinic acid, glutaric acid, maleic acid or the anhydrides of said acids. The drilling, workover or completion fluids may also contain clay-dispersants.

56 Claims, No Drawings

DRILLING FLUIDS

BACKGROUND

This application is a continuation-in-part of our co-pending application Ser. No. 60,637, filed Aug. 3, 1970, now abandoned and is related to co-pending application Ser. No. 173,270, filed Aug. 19, 1971, now U.S. Pat. No. 3,766,229) which is a continuation-in-part of application Ser. No. 867,365, filed Oct. 17, 1969, now abandoned, entitled "Drilling Fluids " which is incorporated herein by reference.

It has been common practice in the oil well drilling industry to employ starches, starch derivatives and water soluble gums for reducing the filtration rate of water base muds. Derivatives of cellulose, such as sodium carboxy methylcellulose, and hydroxy ethylcellulose have also been used as organic colloid additives for reduction of fluid loss of drilling materials. Although these materials reduce the fluid loss of drilling muds, they have other undesirable properties. For example, it is well known that some of the additives mentioned above increase the viscosity of drilling muds undesirably. These materials are not thermally stable when the muds treated therewith are subjected to extreme thermal environments. A synthetic, organic polymer such as hydrolyzed sodium polyacrylate has been extensively used for fluid loss control in drilling muds. This sodium polyacrylate is quite susceptible to contaminates such as calcium or magnesium ions and becomes ineffective as a fluid loss control agent. This material also is not heat stable and inhibits the hydration of clays.

In the drilling of wells, there are some difficulties caused by high temperature and high pressure. The difficulty which is frequently encountered in deeper wells is gelation and/or thickening of the drilling mud. In other words, high temperature and high pressure cause the colloidal components of the drilling muds to flocculate and thereby adversely increase their viscosities, gel strengths and fluid loss. This flocculation of the mud greatly increases the pump pressures required for circulating it. The high temperature gelation is also frequently aggravated by the presence of contaminates such as gypsum, salt, cement, etc. in the drilling mud.

OBJECTS

Accordingly, it is an object of the invention to provide novel compositions of matter having good fluid loss and dispersing characteristics. It is another object of this invention to provide a new and improved drilling fluid additive. It is another object of the invention to provide a new and improved dispersing agent for use in drilling fluids. It is another object to provide a new and improved drilling fluid additive which has superior fluid loss control characteristics. It is a further object to provide a drilling fluid additive that has thermal stability. Another object is to provide an improved method and fluid for the drilling, workover or completion of wells.

Other aspects, objects and advantages of the invention will be apparent to those skilled in the art from the disclosure and appended claims.

BRIEF DESCRIPTION OF INVENTION

In accordance with the present invention and in attainment of the foregoing objects, there are provided novel compositions of matter and methods of using same. According to one embodiment, the composition results from the reaction of at least one salt of sulfonated lignite, sulfonated humic acid or combinations and derivatives thereof and phenolic condensates which are preferably in modified form. According to another embodiment, a composition results from a physical mixture of the above reaction products and sulfonated lignite, sulfonated humic acid or phenolic condensates or combinations and derivatives thereof. In another embodiment, an improved fluid for the drilling, workover or the completion of wells is provided embodying such a composition. In another embodiment, an improved method for the drilling, workover or completion of wells is provided employing such an improved fluid.

A preferred phenolic condensate for use herein is a water soluble sulfomethylated phenolic condensate obtained from the reaction of a phenol, an aldehyde and a metal salt of sulfurous acid. These are reacted under neutral conditions. By "neutral conditions, " it is meant that no chemicals are added to affect the acidity or basicity of the mixture.

The lignite employed herein is a variety of coal intermediate between peat and bituminous coal, especially one in which the texture of the original wood is distinct. Lignite is often called "brown coal" or "wood coal". Its chemical characteristics and composition have been widely described in literature, for example, the Journal of American Chemical Society, Volume 69 (1947) and in the U.S. Bureau of Mines Information circular 7691, Parts 1 and 2, July, 1954.

Lignite contains at least about 40%, by weight, preferably from about 50 to 65%, by weight, on a dry basis of humic acid. The precise molecular structure of lignite is unknown at present, at least partially due to its variable nature. Thus, the molecular structure of sulfonated lignite and humic acid is not known with certainty at present. However, the starting material lignite or humic acid is well known, is available commercially, and compositions that fall within that class are readily ascertainable by those skilled in the art. As will be explained more fully hereinafter, certain lignosulfonates and other dispersants for the clay solids in a drilling mud can also be employed.

The above compositions are particularly designed for use as additives for drilling fluids. They are also useful for controlling fluid loss in cement slurries and may have uses in the tanning industry.

The phhenolic condensates useful herein may be divided into three major categories: 1. Sulfomethylated phenolic condensates prepared under neutral conditions; 2. polymethylol phenol condensates prepared under alkaline conditions; and 3. sulfonated phenolic condensates prepared under acid conditions. The condensates may be further modified as will be detailed hereunder.

DETAILED DESCRIPTION OF INVENTION

It is an advantage of the invention that certain condensation polymerization techniques, which are based on carbonyl addition-substitution reactions, can be used to obtain water soluble and hydrophilic polymers, such as phenol-formaldehyde, phenol-urea formaldehyde and phenol-salicylic acid-formaldehyde.

It is a further advantage that the products produced according to the invention, when used as viscosity and fluid loss control agents in water base muds, resist flocculation due to contamination and high temperatures more effectively than most other agents used for this purpose.

DRILLING FLUIDS

The drilling fluids to which the additives of this invention can be included can contain an effective viscosifying amount of conventional clays. Generally, from about 1 to about 20 weight per cent clay can be employed, but this will vary widely depending upon the functional desires for the final drilling fluid and the clays employed. Suitable clays include kaolins (Kaolinite, Halloysite, Dickite, Nacrite and Endellite), bentonites (Montmorillonite, beidellite, Nontronite, Hectorite and Saponite), hydrous micas (Bravaisite or Illite), attapulgite, sepiolite and the like. Asbestos may also be used for this purpose.

The drilling fluids can also contain conventional weighting agents in effective weighting amounts, these agents including, for example, barium sulfate, calcium carbonate, iron oxide, strontium sulfate (Celestite), mixtures thereof, and the like. Weighting agents can be employed to give drilling fluids having a final density of up to about 22 pounds per U.S. gallon.

Other conventional additives such as emulsifiers, fermentation control agents, and the like can be employed if desired and so long as they are substantially inert to the agents of this invention.

The liquid base for the drilling fluids in aqueous. The aqueous bases include fresh water (sodium chloride content of less than 1 weight per cent and/or calcium content of less than 120 parts per million) and saline water which includes both brackish and sea water (sodium chloride content greater than 1 weight per cent and/or calcium content greater than 120 parts per million). The additives of this invention are particularly useful in saline muds in that their dispersing and fluid loss control functions are not as adversely affected by the salts contamination as other known additives such as the chrome lignosulfonates per se.

All the additives of this invention can be incorporated in the drilling fluids by simple mixing under ambient conditions of temperature and pressure for periods sufficient to give a substantially homogenous mixture. The amount of additive included will vary widely depending upon the composition of the drilling fluid itself, the composition of the additive or additives themselves, the particular conditions in the particular well to which the drilling fluid is to be added, and on and on. Generally, a small amount of additive effective for at least one of dispersing and fluid loss control is suitable. As a nonlimiting example, the drilling fluid can contain amounts of at least one additive of this invention of from about 0.1 to about 15 weight percent based on the total weight of the drilling fluid. Thus, it is preferred that the drilling fluid contain a small but effective amount of the additive sufficient to reduce the fluid loss of the base fluid.

The drilling fluids for use in the examples were prepared as follows:

Sea water fluid system: This is a laboratory standard mud.

The sea water mud was prepared by adding 40 grams Wyoming bentonite and 70 grams Texas bentonite to 350 cc of synthetic sea water. The clay slurry was then stirred for 30 minutes with laboratory dispersator and allowed to stabilize overnight at room temperature. The mud was then stirred to raise the apparent viscosity to 30–40 cps. This mud weighed 10.3 lb/gal.

Field sea water fluid: Thus mud was obtained from an offshore oil well in Southern Louisiana. The mud weight was 9.6 lb/gal. This mud had not been treated at the well site. Analysis of the filtrate of this mud was as follows:

| | |
|---|---|
| Ca | 640 ppm |
| Mg | 1,020 ppm |
| Na | 12,000 ppm |
| Cl | 22,000 ppm |
| K | 364 ppm |

Gyp fluid system: The base mud was prepared by adding 75 grams of a clay blend consisting of 25% East Texas bentonite, 25% Wyoming bentonite, and 50% grundite (Illite) to 350 cc of fresh water. This clay slurry was then stirred for 45 minutes using a high speed dispersator and aged overnight at room temperature. This mud was then converted to a gyp mud by adding 5 grams of calcium sulfate dihydrate to 350 cc of the base mud. The gyp mud was stirred for 30 minutes before use. This mud weighed 9.3 lb/gal.

GENERAL

For use in the examples to follow, a great number of phenolic condensates were prepared and are designated as Agents. The agents were tested separately in the mud systems to provide a comparison between them and the additives obtained after the reaction with sulfonated lignite. Sulfonated lignites were tested separately in the drilling mud systems in the patent application incorporated herein by reference, although some tests are included herein for comparison. A brief description of their preparation is included hereunder. Also tested were physical mixtures of sulfonated lignite and phenolic condensates and physical mixture of the reaction product and sulfonated lignite or phenolic condensate. Other tests involve replacing the sulfonated lignite with certain other dispersants for clays in a drilling mud.

In the examples, all plastic viscosity, yield point, gel strength and fluid loss measurements were made in accordance with the American Petroleum Institute's Recommended Practice entitled "Standard Procedure for Testing of Drilling Fluids ", identified API RP 13 B, 1st Edition, Nov., 1962, published by the American petroleum Institute, New York, New York.

PREPARATION OF LIGNITE DERIVATIVES

The lignite derivatives obtained by sulfonation or sulfonation and complexing with certain transition metals have been shown to be effective in thinning, reducing gel strength and fluid loss control for water base muds. In the examples to follow, the lignite derivative employed was one sulfonated with sodium sulfite, since this is the preferred lignite reactant. This material may be prepared as follows: Into a pressure vessel equipped with a mechanical stirrer and a temperature control is charged 300 grams of ground and dried North Dakota lignite, 30 grams of anhydrous sodium sulfite, 30 grams of anhydrous sodium bisulfite, 60 grams of sodium hydroxide and 1200 cc of water. This mixture is reacted at 150°C. for 3 hours under pressure. The end product is a thin, homogeneous liquid having a ph of about 8.8. The sulfonation reaction may be carried out at temperatures ranging from 25°C. to 200°C., but for reactions that are both rapid and relatively efficient, temperatures from 120°C. to 175°C. are preferred.

When temperatures much above 175° C. are used, extensive degradation of the reacted product takes place with no compensating improvement in quality. When temperatures much below 120°C. are used, the advantages of degradation of lignite and short reaction time are lost. A small portion of sulfonating agent or combinations of various sulfonating agents that are equivalent to about 1 to 10% sulphur is needed for sufficient sulfonation. The preferred range is chemically equivalent to about 5 to 7% sulphur based on dried lignite. The amounts of alkali metal hydroxide to be used can be varied over a considerable range. In order to achieve a practical reaction rate for the sulfonation reaction, the ph of the reaction medium should be at least 10. In any event, the ph of the reaction medium is at least 7 and preferably 10 to 13.

While the foregoing has described preparation of lignites sulfonated with sodium sulfite, the reactants are not limited thereto. The cation for the salts of these sulfonated lignites may be any of the alkali metals, alkaline earth metals and ammonium radical.

These sulfonated lignites may be further complexed with a cation donor selected from the group consisting of chromium, iron, cobalt, nickel, zinc, magnesium, aluminum, and copper.

Methods and variables involved in preparing the sulfonated lignites, sulfonated humic acid and derivatives thereof useful in the present invention are fully and adequately described in application Ser. No. 867,365 discussed above. Reference should be had to that application for all modifications and variations of these reactants which can be utilized in the present invention.

OTHER DISPERSANTS

Lignosulfonates can be used as a substitute, in whole or in part, for the sulfonated lignite described above. such lignosulfates include the the alkali metal and alkaline earth metal salts of lignosulfonate. They also include an oxidized salt of a sulfonated lignin material wherein the salt has a cation selected from the group consisting of iron, chromium, copper and aluminum. The latter class of lignosulfonates can be made in accordance with the King et al U.S. Pat. No. 2,935,473. However, all of the above lignosulfonates are readily available on the open market and sold under various trademarks such as Kembreak, Q-Broxin, Spersene, VC-10, etc.

Other deispersants commonly added to drilling mud to disperse clay solids therein can be employed with varying degree of effectiveness dependent largely, although not entirely, upon the composition and characteristics of a particular mud system. Such dispersants are also called "thinners". Among them are the tannin materials and the sulfonated tannin materials, such as sulfonated hemlock bark extract, guebracho, etc., and the phosphates such as sodium tetraphosphate.

PREPARATION OF PHENOLIC CONDENSATES

The methods of preparing phenolic condensate reactants may be divided into three major categories:
I. sulfomethylated phenolic condensate prepared under conditions according to an embodiment of the present invention.

These polymers are prepared by condensing formaldehyde with a phenol in such a way as to introduce ionic sites in the final resin. This can be achieved by using an ionic co-reactant which can enter into the polymer structure. The sulfonation reaction can be carried out by using anhydrous bisulfite or anhydrous sulfite or a combination of both. More accurately, the phenolic condensate is referred to as sulfomethylated.

In the examples, sodium bisulfite and sulfite are used as co-reactants in a phenol-formaldehyde condensation to formulate the various agents. This introduces —CH$_2$SO$_3$Na groups into the phenol-formaldehyde condensate product. For example, we have used a basic formula of phenol (1.0 mol), anhydrous sodium bisulfite (0.25mol), anhydrous sodium sulfite (0.25 mol), paraformaldehyde (2.0 mol) and water (1.0 mol) in preparing sulfonated phenol-formaldehyde condensates.

When this mixture is placed in a suitable container, equipped with a stirrer or agitator and a reflux condenser, and stirred, an exothermic reaction occurs, and the temperature rises to about 125°C. When the initial reaction subsides, the mixture is heated to reflux until a viscous syrup results. The structure of the resulting product is shown as follows:

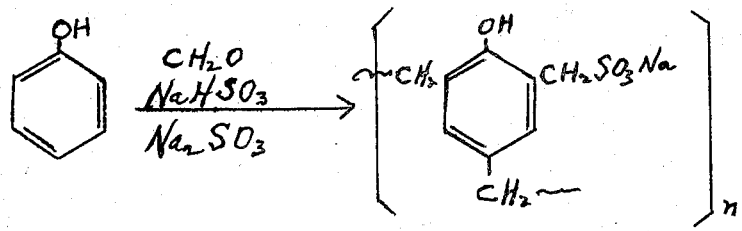

When p-phenolsulfonic acid is used as a starting material and then condensed with formaldehyde, the reaction will be as follows:

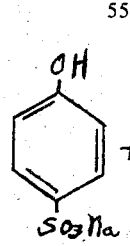

Phenol or monohydroxylbenzene is the fundamental unit from which the others may be considered to be derived. The following classes of phenols are applicable to this invention: (a) monohydric phenols and (b) polyhydric phenols. Because phenol is readily available and is convenient to handle, it is extensively used in the examples included herein and is the preferred phenolic material. Other monohydric phenols, which can be used for making resins, include cresols and xylenols. Polyhydric phenols include dihydric phenols such as resorcinol. The tar acids, which are mixtures of phenol, cresols, xylenols and high-boiling residues, are also equally applicable to this invention. Also, "phenol bottoms" can be used. This material is produced in the manufacture of phenol and is the bottoms produced from the distillation tower from which phenol is taken as the overhead product. It is a mixture of phenol, cresols, xylenols and higher boiling residues.

Thus, in summary, the phenolic material is one or more (i.e., at least one) of the group consisting of phenol, cresol, xylenol, resorcinol, tar acid and phenol bottoms.

Various forms of formaldehyde can be used in preparing the phenolic condensate, such as aqueous solutions thereof. As used herein, "formaldehyde" will also cover paraformaldehyde.

The sulfonated phenolic condensates of this invention may be further modified using certain reagents. Such modifying reagents are at least one material selected from the group consisting of urea, melamine, salicylic acid, benzoic acid, phthalic acid, adipic acid, succinic acid, glutaric acid, maleic acid and the corresponding anhydrides of such acids such as maleic anhydride, benzoic anhydride, phthalic anhydride, etc.

The condensates may generally be prepared by reacting formaldehyde with the selected phenolic material in a molar ratio of 1:1 to 6:1, preferably 1:1 to 3:1, and still more preferably 2:1, e.g., from 1.0 to 3.0 mols of formaldehyde with 1.0 mol of phenol, in an aqueous solution containing from about 0.1 to 2.0 mols preferably from about 0.25 to 0.75, mols, and still more preferabyl about 0.5 mol, of certain water soluble metal salts of sulfurous acid. The metal salts of sulfurous acid includes alkali metal sulfites alkali metal bisulfites, alkali metal metabisulfites, formaldehyde alkali metal bisulfite, and formaldehyde alkali metal metabisulfites. Any of these sulfites or a combination of two or more sulfites may be used. When used, the selected modifying reagent can be used in an amount of from 0.1 to 3 mols, preferably from 0.25 to 2 mols, and most preferably 0.5 mols, per mol of phenolic material.

II. Polymethylol phenol condensate prepared under alkaline conditions.

In the presence of alkaline catalyst and with more formaldehyde, the methylolphenols can condense either through methylene linkages or through ether linkages. In the latter case, subsequent loss of formaldehyde may occur with methylene bridge formation. The first step in the reaction is the formation of addition compounds known as methylol derivatives. The reaction takes place at the ortho or para position. These products, which may be considered as monomers for subsequent polymerization, are formed under neutral or alkaline conditions.

The polymethylol phenol condensate is prepared by condensing 2.0 mols to 3.0 mols of formaldehyde with 1.0 mol of phenol under carefully controlled alkaline conditions and temperatures. The water soluble polymethylol phenol to be complexed with sulfonated lignite can be prepared by reacting other phenols or mixtures of phenol having at least functionality of two with sufficient formaldehyde in alkaline solution to form a product having a formaldehyde to phenol mol ratio within the range of 2.0 to 3.0. Thus, the phenolic material can be at least one of the group consisting of phenol, cresol, xylenol, resorcinol, tar acid and phenol bottoms as set out above for the preparation of the sulfomethylated condensate. In this reaction, condensation is through methylol linkage rather than through formaldehyde linkage. Formaldehyde reacts very rapidly with phenol in the presence of substantial amounts of caustic soda. Under proper conditions, exothermic heat can be used to raise the temperature to permit refluxing. For example, a favorable polymethylol phenol condensate may be prepared by mixing together formaldehyde, phenol, and sodium hydroxide in a mol ratio of 2:1:0.25 in a flask equipped with a condenser and a mechanical stirrer.. The mixture reaches reflux temperature, and is allowed to remain there until the exotherm subsides, at which time it is cooled to room temperature to stop the reaction. At this point, it will have a viscosity of about 200 centipoises (measured at 25°C. with Brookfield RVF Viscometer at 20 rpm). The end product is a watery, yellow, clear liquid having ph of 11.2 and is soluble in water. This end product is ready for complexing with sulfonated lignite. The product is spray dried in the conventional manner.

This condensate may be formed by reacting formaldehyde with phenol in a molar ratio of 3.0 to 1.0 in alkaline solution at temperatures ranging from 60°C. to 150°C. and times ranging from 10 minutes to 10 hours, time being only an economic limit.

III. Sulfonated phenolic condensates prepared under acid conditions.

These water soluble sulfonated phenolic polymers are prepared by reacting sulfonated phenols with formaldehyde at a temperature of about 90°to 100°C. Preferred polymers include water soluble sulfonated phenol-formaldehyde condensation products prepared by condensing a sulfonated phenolic compound (functionality of two) with formaldehyde to form a water soluble product. We have used p-phenolsulfonic acid or p-phenolsulfonic acid sodium salt in the preparation of sulfonated phenolic polymers. It will be understood that other suitable sulfonated phenolic materials are applicable. Thus, the phenolic material is at least one sulfonated material selected from the group consisting of phenol, cresol, xylenol, resorcinol, tar acid and phenol bottoms. When phenol is employed as the starting material, it is reacted with a slight molar excess of sulfuric acid at 100°C. for a time sufficient to convert a portion of phenol to mono-sulfonated phenol. We have used a sulfuric acid-to-phenol mol ratio of from 1.0 to 1.5. The sulfonation reaction is carried out at about 100°C. for about 1 hour under refluxing conditions. On completion of the sulfonation, the mixture is cooled to room temperature and is neutralized with 50% sodium hydroxide solution to a ph of 4.5 in order to stop the sulfonation reaction. The neutralization is also carried out for the purposes of reducing the amount of sulfuric acid present such that the rate of reaction can be controlled. Similarly, the other phenolic materials as set out above can be sulfonated using similar procedures. The sulfonation step is so conducted that the amount of monosulfonated phenol or the other phenolic materials is large while the amount of polysulfonated phenol or the other phenolic materials is small.

On completion of the sulfonation step, an aqueous solution of formaldehyde, in amounts between 0.75 and 1.0 mols per mol of phenol or the othher phenolic materials, is reacted with the resulting sulfonated phenol or the other phenolic materials in order to carry out the condensation reaction. The remaining unreacted sulfuric acid from the sulfonation condensation step is then neutralized with 50% caustic solution. condensation reaction temperatures ranging from 60°C. to 100°C. may be used.

During the condensation reaction, the reaction mixture becomes increasingly viscous due to increases in chain length of the sulfonated phenol-formaldehyde condensation product. It is necessary to permit the reaction to proceed until the molecular weight of the condensation product become sufficiently high, but the reaction must be terminated at the proper time so as to prevent the condensation product from increasing in molecular weight to the point of becoming insoluble in water. When the reaction mixture has attained the proper viscosity, the reaction is terminated. The condensation reaction may be terminated by diluting the reaction mixture with water and quickly neutralizing the diluted mixture with a suitable neutralizing agent. The resulting mixture has a viscosity in the range of 100 to 300 cps at 75°C.

A wide variety of chemical materials may be used as catalysts for making the above resinous products. The amounts of catalysts are specified as some percentage of the phenol employed. With acid catalysts, the amount is usually less than 2%. Organic acids, such as formic acid, toluenesulfonic acid, and a mineral acid, such as sulphuric acid or hydrochloric acid, are important ones. With alkaline catalysts, the range is usually about 2 to 12%. Important alkaline catalysts are sodium hydroxide, sodium carbonate, potassium hydroxide, potassium carbonate, barium hydroxide, ammonia, and various amines. Besides acid and alkaline catalysts, oxide and hydroxides of zinc, magnesium or aluminum may be used for preparing the resins.

A wide variety of these phenolic resin compositions are known to those skilled in the art. Formaldehyde condenses readily with phenols primarily in the ortho and para positions to give cross-linked polymers having aromatic rings linked together by methylene or oxymethylene bridges. The reaction is carried out only to such a point that a water soluble, meltable condensate is formed.

Effect of Reaction Time

EXAMPLE I

Agents A-1 to A-5

The water soluble, hydrophilic sulfonated phenolic resins are prepared by condensing formaldehyde with phenol in such a way as to introduce ionic sites in the resin. This effect is achieved by using sulfonating agents such as sodium sulfite and sodium bisulfite which enter into the polymer structure. A series of resins was prepared by varying refluxing time and altering the method of adding water into the polymer syrup. In a 1000 ml three-necked flask equipped with a mechanical stirrer, thermometer and condenser were placed 94 grams (1.0 mol) distilled phenol, 26 grams (0.25 mol) anhydrous sodium bisulfite, 31.5 grams anhydrous sodium sulfite, 60 grams paraformaldehyde and 18 cc of water. The mixture had a pH of 5.9. The mixture was heated to 70°C. An exothermic reaction occurred as the mass was stirred, and from its own heat expenditure the reaction temperature rose to 129°C. The mixture then turned to a pale yellow, cloudy solution and then to a clear yellow syrup in about 2 minutes and refluxed at 122°C. After refluxing 5 more minutes the temperature dropped to 118°C. as the mixture was diluted by water formed from the reaction; 250 cc of water was gradually added to stop further polymerization. This polymer was designated as Agent A-1.

Another water soluble and hydrophilic resin was prepared by refluxing for 10 minutes after the initial exothermic reaction. The mixture, containing the same amounts of chemicals as in Agent A-1, was actually refluxed for 5 minutes, then 25 cc of water was added and it was refluxed for 5 more minutes, after which 225 cc of water was added to quench the reaction. The resulting resin was designated as Agent A-2.

The next water soluble resin was also prepared by prolonging the reaction time. After the initial exothermic reaction subsided, the reaction was carried out by refluxing 10 minutes and adding 25 cc of water. The mixture was then refluxed 5 more minutes and 25 cc of water was added. The reaction was continued 5 more minutes and 200 cc of water was slowly added in order to quench the reaction. This resin was designated as Agent A-3.

The next resin was also prepared by prolonging the reaction time. After the initial exothermic reaction subsides, the mixture was refluxed for 10 minutes at 118°C. and 25 cc of water was added. The mixture was then refluxed for an additional 10 minutes at 109°C. and 25 cc of water was added. Then, it was refluxed for 5 minutes at 107°C. and 25 cc of water was again added. The reaction was refluxed 5 more minutes at 105°C. and quenched by adding 175 cc of water. This resin was designated as Agent A-4.

The final resin of this series was prepared by refluxing for 10 minutes at 118°C. followed by adding 25 cc of water, refluxing 10 more minutes at 109°C. followed by adding 25 cc of water and refluxing another 10 minutes at 105.5°C. followed by adding 25 cc of water. The reaction was quenched after refluxing for 10 minutes by adding 175 cc of water. This is designated as Agent A-5.

The viscosity of the resulting resins was measured using a Brookfield Viscometer Model RVF with No. 1 Spindle at 20 rpm. The viscosity was measured at three different temperatures (75°, 50°, and 25°C.) in order to establish the relationship between viscosity and temperature. The viscosity and pH of the resin is tabulated in Table I below.

Table I

| RESINS | VISCOSITY — cps | | | pH |
| | 75°C. | 50°C. | 25°C.* | |
|---|---|---|---|---|
| A-1 | 11.00 | 16.5 | 32.0 | 9.6 |
| A-2 | 12.5 | 18.0 | 37.3 | 9.7 |
| A-3 | 14.0 | 26.0 | 68.5 | 9.8 |
| A-4 | 18.0 | 32.5 | 120.0 | 9.8 |
| A-5 | 26.5 | 63.0 | 440.0 | 9.9 |

*Viscosities were measured after 72 hours from the completion of reaction

Viscosities were measured after 72 hours from the completion of reaction

It is noticeable from these data that the viscosity is increased by extending the reaction time. However, Agent A-5 was still pourable after aging for 3 days.

Agent A-6 was prepared by prolonging the refluxing time without addition of water during the reaction. After the initial exothermic reaction subsided, the mixture was refluxed about 25 mintues without adding water. The reaction cannot go further at this stage without adding water because of high viscosity. The reaction was quenched by adding 250 cc of water. A thick, reddish syrup resulted and was coded as Agent A-6.

Effect of Variation in Amounts of Chemical Components

Agent B

This was prepared by doubling the amounts of sulfites used in the preparation of Agents A-1 to A-6. In a suitable reactor equipped with a stirrer, a reflux condenser and a thermometer were charged 94 grams distilled phenol, 60 grams paraformaldehyde, 73 grams anhydrous sodium sulfite (0.5 mol), 52 grams anhydrous sodium bisulfite and 27 ml water. The mixture was heated to about 75°C. which initiated an exothermic reaction that quickly caused the temperature to reach 123°C. The mixture was yellow and cloudy while refluxing. The mixture was then refluxed (115°C.) for 10 minutes and was still thick and cloudy. Then 25 ml water was added to the mixture. This was refluxed (115°C.) for 10 minutes, followed by an addition of 25 ml water; refluxed (110°C.) for 10 minutes followed by an addition of 25 ml water; refluxed (109°C.) for 10 minutes, followed by an addition of 25 ml water; refluxed (106.5°C.) for 10 minutes; and then the reaction was quenched by adding 175 ml water. A reddish syrup having a pH of 10.3 was obtained. The viscosity of the resin measured at three different temperatures is shown in Table II below Table II

| TEMPERATURE | BROOKFIELD VISCOSITY |
|---|---|
| 75°C. | 20.5 cps |
| 50°C. | 31.0 cps |
| 25°C. | 93.0 cps |

Agent C this was prepared by reducing the amounts of sulfites used in the preparation of agents A-1 to A-6. The polymerization process was slightly altered in order to control the viscosity. In a suitable reactor equipped with a stirrer, a reflux condenser and a thermometer were charged 94 grams phenol, 60 grams paraformaldehyde, 13 grams (⅛ mol) anhydrous sodium bisulfite, 15.75 grams (⅜ mol) anhydrous sodium sulfite and 18 ml water. The mixture was heated to about 70°C. which initiated an exothermic reaction that caused the temperature to reach 125°C. The mixture changed color from cloudy yellow to clear pale yellow while refluxing. Heat was applied to reflux the mixture. The mixture was refluxed (116°C.) for 10 minutes, followed by an addition of 50 cc water; refluxed (106.5°C.) for 10 minutes, followed by an addition of 50 cc water, refluxed (104.5°C.) for 10 minutes, and the reaction was quenched by adding 150 cc water. A thick, light brown syrup having a pH of 9.6 resulted. The viscosity of the resin was measured using a Brookfield RVF Viscometer at 20 rpm. The results are as shown in Table III below.

Table III

| TEMPERATURE | BROOKFIELD VISCOSITY |
|---|---|
| 75°C. | 74.5 cps |

Table III-continued

| TEMPERATURE | BROOKFIELD VISCOSITY |
|---|---|
| 50°C. | 550 cps |
| 25°C. | gelled |

These resins were tested in the sea water mud as fluid loss control agents. The sea water mud was treated with 10 lb/bbl of the resin and the appropriate amount of sodium hydroxide and then heat aged at 150°F. for 16 hours. The final properties were measured after the mud was cooled to room temperature. The results of the mud performance are summarized in the following Table IV.

Table IV

| | PV (3) | YP (4) | 1 MIN GEL (5) | 10 MIN GEL (6) | API F.L. (7) |
|---|---|---|---|---|---|
| Agent A-1 | 13 | 11 | 7 | 22 | 37.5 |
| Agent A-2 | 14 | 12 | 7 | 22 | 36.0 |
| Agent A-3 | 10 | 13 | 8 | 23 | 35.5 |
| Agent A-4 | 14 | 10 | 8 | 19 | 34.0 |
| Agent A-5 | 12 | 12 | 7 | 22 | 32.0 |
| Agent A-6 | 12 | 17 | 9 | 24 | 11.0 |
| Agent B | 12 | 19 | 17 | 35 | 43.0 |
| Agent C | 15 | 13 | 7 | 19 | 13.9 |
| Agent C (1) | 13 | 40 | 34 | 72 | 8.5 |
| Agent C (2) | 14 | 39 | 37 | 62 | 11.0 |
| Base Mud | 11 | 26 | 17 | 36 | 38.0 |

(1) Properties after aging at 250°F. for 16 hours
(2) Properties after aging at 350°F. for 16 hours
(3) Plastic viscosity expressed as cps
(4) Yield point expressed as lb/100 ft²
(5) Gel strength expressed as lb/100 ft²
(6) Gel strength expressed as lb/100 ft²
(7) API 30 minute fluid loss, cc This table indicates that the fluid loss control of the resin is directly related to the reaction time. Thhe fluid loss values decrease as the reaction time increases with the series of Agents A-1 to A-6. It is clear that Agent A-6 is much more effective than the rest of the agents in the series in reducing the fluid loss. The rheological properties of these products are also important.

It is interesting to notice the mud properties of Agent B and Agent C. Agent C shows good fluid loss control properties over wide ranges of temperature. Agent B fails to actually control fluid loss but does have viscosity control. However, modifying Agent B with one or more of the modifying reagents as described above (e.g., urea) causes it to control fluid loss.

Modification with Salicyclic Acid and Variation in Reation Procedures

EXAMPLE II

Agent D

This is a modified sulfonated phenolic condensate with salicylic acid. The mixture for preparing Agents A-1 to A-6 was modified using salicylic acid in order to prepare a cross-linked polymer. In a three-necked flask equipped with a stirrer and a condenser, 110 grams (1.0 mol) 85% phenol was reacted with 26 grams (0.25 mol) of anhydrous sodium bisulfite, 31.5 grams (0.25 mol) of anhydrous sodium sulfite, 60 grams (2.0 mols) of paraformaldehyde and 10 cc of water. After the exothermic reaction subsided, 49 grams (0.36 mol) of salicylic acid was added and the mixture was heated and refluxed until a viscous syrup resulted. 250 cc of water was added to stop the reaction. The resulting syrup has a pH of 5.0.

Agent E

In an effort to reduce the cross-linking due to salicylic acid in Agent D, the amount of salicylic acid was reduced to one-half of its original formula. Agent E was prepared by adding 24.5 grams of salicylic acid in the formula for Agent D.

In a three-necked flask equipped with a mechanical stirrer, a reflux condenser, and a thermometer were placed 94 grams phenol, 60 grams paraformaldehyde, 26 grams anhydrous sodium bisulfite, 32 grams anhydrous sodium sulfite and 18 cc water. The mixture was heated to 75°C. which initiated an exothermic reaction that quickly caused the temperature to reach 128°C., the material refluxing rapidly. A cloudy, yellow solution was formed at this stage. Then, 24.5 grams of salicylic acid were added in order to modify the polymer. A series of resins was prepared by varying the refluxing time and the amounts of water added while refluxing.

Agent E-1

To the basic formula (Agents A-1 to A-6) 24.5 grams salicylic acid was added, and the mixture was refluxed (115°C.) for 10 minutes. The reaction was ended by adding 250 cc of water.

Agent E-2

The basic formula containing salicylic acid was refluxed (110°C.) for 10 minutes, followed by an addition of 25 ml water and refluxed (109°C.) for 10 minutes. The reaction was ended by adding 225 cc water.

Agent E-3

The basic formula containing salicylic acid was refluxed (118°C.) for 10 minutes, followed by an addition of 25 ml water, refluxed (114°C.) for 10 minutes, followed by an addition of 25 ml water, refluxed (110°C.) for 10 minutes and the reaction was ended by adding 200 cc water.

Agent E-4

The basic formula containing salicylic acid was refluxed (117°C.) for 10 minutes followed by an addition of 25 ml water, refluxed for 10 minutes, followed by an addition of 25 ml water, refluxed for 20 minutes and followed by an addition of 50 ml water. The reaction was ended by adding 150 ml of water.

Agent E-5

This agent was prepared using a slightly different method. The basic formula (Agents A-1 to A-6) was heated to 50°C., and 24.5 grams salicylic acid was added immediately. The reaction was then refluxed, but the regular scheme of this reaction was quite different from previous reactions. The viscosity of the mixture was low until this mixture was refluxed for 45 minutes. Then the viscosity of the mixture rose slowly. The reaction was quenched by adding 250 ml water after a total of 1 hour refluxing.

The viscosity of the resin was measured using a Brookfield RVF Viscometer at three different temperatures while the resin was cooling right after the reaction. The observed viscosity and pH value of the resin are tabulated in Table V below.

Table V

| AGENTS | TOTAL REFLUXING TIME, MINUTES | VISCOSITY, cps 75°C. | 50°C. | 25°C. | pH |
|---|---|---|---|---|---|
| E-1 | 10 | 9.0 | 12.5 | 25.0 | 8.8 |
| E-2 | 20 | 12.0 | 17.5 | 47.5 | 9.0 |
| E-3 | 30 | 13.0 | 21.0 | 58.0 | 8.9 |
| E-4 | 50 | 40.0 | 110.0 | 456.0 | 8.6 |

Table V-continued

| AGENTS | TOTAL REFLUXING TIME, MINUTES | VISCOSITY, cps 75°C. | 50°C. | 25°C. | pH |
|---|---|---|---|---|---|
| E-5 | 60 | 114.0 | 236.0 | 2100.0 | 8.4 |

The E-series agents were also tested in sea water muds. The sea water mud was treated with 10 lb/bbl of the resin and suitable amounts of caustic soda and was heat aged. The mud properties were measured initially and after heat aging at 150°, 250° and 350°F. The mud test results on Agent E-4 and Agent E-5 are tabulated in Table VI below.

Table VI

| AGENTS | AGED TEMP °F | PV | YP | 1 MIN GEL | 10 MIN GEL | API F.L. |
|---|---|---|---|---|---|---|
| E-4 | Initial | 19 | 9 | 1 | 28 | 13.8 |
|  | 150° | 11 | 8 | 4 | 10 | 17.0 |
|  | 250° | 12 | 17 | 30 | 45 | 15.3 |
|  | 350° | 13 | 24 | 25 | 35 | 10.0 |
| E-5 | Initial | 24 | 10 | 1 | 17 | 10.9 |
|  | 150° | 13 | 11 | 3 | 10 | 11.3 |
|  | 250° | 12 | 31 | 27 | 37 | 11.8 |
|  | 350° | 15 | 26 | 27 | 30 | 8.8 |
| Base Mud | Initial | 10 | 23 | 16 | 25 | 36.6 |
|  | 150° | 11 | 26 | 17 | 36 | 38.0 |
|  | 250° | 10 | 28 | 21 | 36 | 39.5 |
|  | 350° | 11 | 36 | 34 | 38 | 46.0 |

As the table indicates, Agent E-4 and E-5 had excellent fluid loss controlling ability over wide ranges of heat aging temperature. These muds also did not lose their beneficial rheological properties. It can be seen readily from this table and the data in Example I that the modified resins are a significant improvement over the Agent A series.

EXAMPLE III

Agent F

Agent D was again modified by reducing the amount of salicylic acid further. Agent F was prepared by adding 12.25 grams of salicylic acid in the formula for Agent D. The reaction was carried out according to the procedure for Agent D. The viscosity of Agent F was further reduced.

Modification with Urea and Variation in Reaction Procedures

EXAMPLE IV

Agent G

The formula for Agent A series was modified using 1 mol of urea. After the initial reaction subsided in the process of making Agent A, the modification with urea was made in the same manner as the salicylic acid modification (Agent D). Because of the high functionality of the nitrogen in the urea, the reaction products with urea are more complex polymers. In a three-necked flask equipped with stirrer and condenser were placed 110 grams 85% phenol, 32 grams anhydrous sodium sulfite 36 grams anhydrous sodium bisulfite and 75 grams paraformaldehyde which was then heated to reflux. After the exothermic reaction subsided, 60 grams urea and 25 ml water were added. The mixture was then refluxed for 80 minutes at 120°C. Then, 125 ml of water was added portion-wise to control viscosity. The reaction was ended by removing the heat source, and quenching with the addition of 125 mo water.

EXAMPLE V

Agent H

The formula for the Agent A series was modified using the urea again. In this example, mixtures of phenol with urea were condensed with formaldehyde. Such compositions contain the structural features of the network system of cross-linked molecules. A series of resins were prepared by varying the reaction time in order to demonstrate the effect of resin viscosity on mud porperties. At first, the formula for the Agent A series was directly applied and then modified with 0.5 mol of urea. Into a 1000 ml three-necked flask equipped with a stirrer, a condenser and thermometer were placed 95 grams distilled phenol, 26 grams anhydrous sodium bisulfite, 31.5 grams anhydrous sodium sulfite, 60 grams paraformaldehyde and 18 ml of water. As in the case of the Agent A series, the mixture was heated until all chemicals went into solution and the heat source was removed. An exothermic reaction was initiated and the mixture was refluxed at 127°F. While the mixture was slowly cooled, the mixture turned from an opaque solution to a clear yellow solution. At this point, 30 grams urea were added and the mixture was refluxed with an outside heat source. The variables in this series are refluxing time after the addition of urea, and the amounts of water added at each reaction interval. The reaction viscosities were measured at three different temperatures using a Brookfield RVF Viscometer at 20 rpm and are tabulated in Table VII below.

Table VII

|  | H-1 | H-2 | H-3 | H-4 |
|---|---|---|---|---|
| Refluxed After Adding Urea | 10 min at 119°C. | 10 min at 121°C. | 10 min at 119°C. | 10 min at 119°C. |
| Water Added | 250 cc* | 25 cc | 25 cc | 25 cc |
| Refluxed |  | 5 min at 114°C. | 10 min at 109°C. | 10 min at 109°C. |
| Water Added |  | 25 cc | 25 cc | 25 cc |
| Refluxed |  | 5 min at 107°C. | 6.5 min at 108°C. | 5 min at 107°C. |
| Water Added |  | 200 cc* | 25 cc | 25 cc |
| Refluxed |  |  | 3.2 min at 105°C. | 5 min at 106°C. |
| Water Added |  |  | 175 cc* | 25 cc |
| Refluxed |  |  |  | 5 min at 104°C. |
| Water Added |  |  |  | 125 cc* |
| Total Reaction Time | 10 min | 20 min | 30 min | 40 min |
| pH of Resin | 9.6 | 9.8 | 10.0 | 10.2 |
| Viscosity at 75° | 12.5 cps | 26.4 | 32.0 cps | 160.0 cps |
| 50° | 16.5 | 43.0 | 97.5 | 930.0 |
|  | 36.5 | 298.5 | 866.0 | 50,000.0 |

*The reaction was quenched at this point.

If the reaction is carried out for 30 minutes with additions of water as needed to maintain maximum viscosity until ending the reaction by adding the balance of 250 cc of water, a high degree of reaction is achieved. The hot resin is still pourable and has a viscosity of 11,000 cps measured at 75°C. at 20 rmp. This resin sets hard upon cooling, but it still maintains water solubility.

Agent H-5 was prepared by refluxing for 10 additional minutes after Agent H-4 was formed. It was reacted for a total of 50 minutes before the reaction was quenched by the addition of 125 cc water. The resin was pourable right after the reaction, but hardened into a gel after aging several days. However, the gel was still water soluble and effective as a mud additive.

These agents were tested in the sea water mud at various heat aging temperatures in order to determine their thermal stability in the mud. The sea water was treated with 10 lb/bbl of Agents H-1 to H-5 and appropriate amounts of sodium hydroxide. After stirring the treated mud, initial properties were measured. The mud and filtrate were recombined, stirred and heat aged for 16 hours at 150°F. Then heat aged properties of the mud were checked. The same process was repeated at 250°F and 350°F. The properties of the mud are summarized in the following Table VIII.

Table VIII

| AGENTS | AGED TEMP°F. | PV | YP | 1 MIN GEL | 10 MIN GEL | API F.L. |
|---|---|---|---|---|---|---|
| Agent H-1 | Initial | 13 | 16 | 18 | 41 | 47.5 |
|  | 150° | 11 | 11 | 6 | 19 | 37.5 |
|  | 250° | 11 | 18 | 14 | 52 | 29.0 |
|  | 350° | 13 | 17 | 22 | 73 | 12.4 |
| Agent H-2 | Initial | 16 | 4 | 3 | 24 | 33.3 |
|  | 150° | 11 | 9 | 6 | 22 | 13.6 |
|  | 250° | 11 | 19 | 15 | 53 | 12.2 |
|  | 350° | 9 | 21 | 22 | 53 | 11.7 |
| Agent H-3 | Initial | 13 | 7 | 3 | 54 | 25.0 |
|  | 150° | 12 | 10 | 5 | 18 | 12.0 |
|  | 250° | 12 | 20 | 15 | 77 | 11.0 |
|  | 350° | 13 | 20 | 27 | 70 | 11.6 |
| Agent H-4 | Initial | 18 | 18 | 11 | 134 | 16.8 |
|  | 150° | 15 | 19 | 11 | 32 | 8.8 |
|  | 250° | 10 | 33 | 25 | 48 | 8.0 |
|  | 350° | 10 | 30 | 36 | 81 | 9.8 |
| Agent H-5 | Initial | 16 | 46 | 53 | 53 | 14.2 |
|  | 150° | 12 | 26 | 14 | 36 | 8.0 |
|  | 250° | 10 | 33 | 31 | 91 | 7.3 |
|  | 350° | 11 | 36 | 42 | 109 | 9.0 |
| Base Mud | Initial | 10 | 23 | 16 | 25 | 36.6 |
|  | 150° | 11 | 26 | 17 | 36 | 38.0 |
|  | 250° | 10 | 28 | 21 | 36 | 39.5 |
|  | 350° | 11 | 36 | 34 | 38 | 46.0 |

This table clearly indicates that the fluid loss properties of these muds were actually improved by heat aging and were stable throughout the tests. It is also clear that the longer the reaction time, the better the fluid loss control. Agents H-2 through H-5 show excellent fluid loss control properties over a wide range of heat aging temperatures. The low molecular weight agents (Agents H-1 through H-3) also exhibit thinning action (deflocculation) throughout the tests. While Agents H-4 and H-5 have excellent fluid loss control, they suffer in rheological properties.

EXAMPLE VI

Agent I

This is also a resin modified with urea. In a three-necked flask fitted with stirrer and condenser were charged 94 grams phenol, 60 grams paraformaldehyde, 26 grams anhydrous sodium bisulfite, 32 grams anhydrous sodium sulfite and 18 ml water. The mixture was refluxed. After all chemicals went into solution, 15 grams urea was added. The mixture was heated to reflux for 30 minutes at 120°C. When the viscosity of the resin built up, 25 ml of water were added at 10 minute intervals. The total amount of water added was 250 ml. The resulting syrup was viscous, but pourable. The viscosity of the syrup was 905 cps measured with a Brookfield RVF-Viscometer at 20 rpm at 72°C.

Modification with Melamine and Variation in Reaction Procedure

EXAMPLE VII

Agent J

The reaction between melamine and formaldehyde is similar in mechanism to that of urea. The methylol melamine condenses to form resinous polymers by heating under mild conditions. The progressive polymerization of the methylol melamine is dependent upon the reaction pH. At a pH of 7, water soluble, hydrophilic polymers are formed. In the modification of the formula for the Agent A series with melamine, the principle discussed above is directly applied. A three-necked flask was charged with 94 grams phenol, 60 grams paraformaldehyde, 32 grams anhydrous sodium sulfite, 26 grams anhydrous sodium bisulfite, and 18 ml water. The pH of the mixture was then adjusted to 7, using a 10% NaOH solution. The mixture was refluxed until all chemicals went into solution, then 31.5 grams melamine was added, and the mixture was refluxed until a viscous syrup was formed.

Agent K

The formula for the Agent A series was modified in order to improve its properties. Into a three-necked flask was placed 94 grams distilled phenol, 60 grams paraformaldehyde, 31.5 grams anhydrous sodium sulfite, 26 grams anhydrous sodium bisulfite, and 18 ml water. The mixture was heated to 75°C. and then the heat was removed. An initial exothermic reaction raised the temperature to 127°C. and the mixture became a cloudy yellow solution. As it cooled, the solution became a clear pale yellow. The solution was then cooled to 50°C. It had a pH of 8.0. To this mixture, 5 cc of 10% sodium hydroxide solution was added which increased the alkalinity. The reaction was resumed by refluxing the mixture after adding 15.17 grams (⅛ mol) melamine and 20 cc water. It was refluxed at 110°C. for 10 minutes and followed by an addition of 20 cc water. The mixture was refluxed at 108°C. for 10 minutes, followed by an addition of 20 cc water; refluxed at 107°C. for 10 minutes, followed by an addition of 20 cc water; refluxed at 105°C. for 10 minutes followed by an addition of 15 grams paraformaldehyde and 60 cc water; and refluxed at 104°C. for 10 minutes. The mixture changed from yellow to dark red, and the viscosity increased substantially. The reaction was ended by slowly quenching with 160 cc of water. The resulting resin was a reddish gel and was water soluble.

Agent J and Agent K were tested in the sea water mud. The sea water mud was treated with 10 lb/bbl of the resin and suitable amounts of caustic soda. The mud properties were measured initially and after heat aging at 150°, 250° and 350°F. The results of the mud performance tests are summarized in the following Table IX.

Table IX

| AGENTS | AGED TEMP°F. | PV | YP | 1 MIN GEL | 10 MIN GEL | API F.L. |
|---|---|---|---|---|---|---|
| J | Initial | 17 | 30 | 27 | 86 | 30.0 |
|  | 150° | 14 | 17 | 11 | 31 | 11.2 |
|  | 250° | 13 | 18 | 40 | 76 | 12.1 |
|  | 350° | 13 | 33 | 37 | 67 | 13.9 |
| K | Initial | 17 | 19 | 3 | 75 | 11.0 |
|  | 150° | 10 | 16 | 8 | 22 | 8.0 |
|  | 250° | 18 | 25 | 36 | 45 | 9.3 |
|  | 350° | 18 | 22 | 34 | 87 | 11.7 |
| Base Mud | Initial | 10 | 23 | 16 | 25 | 36.6 |
|  | 150° | 11 | 26 | 17 | 36 | 38.0 |
|  | 250° | 10 | 28 | 21 | 36 | 39.5 |
|  | 350° | 11 | 36 | 34 | 38 | 46.0 |

The table shows that these resins have improved fluid loss control properties and are thermally stable. Their thinning ability is not affected by heat aging at elevated temperatures. These modified melamine polymers obviously have some advantages over the Agent A series.

Modification with Phthalic Anhydride

EXAMPLE VIII

Agent L

The formula for the Agent A series are modified using phthalic anhydride. A three-neck flask was equipped with a mechanical stirrer, a reflux condenser and a thermometer. The reactor was charged with 110 grams 85% phenol, 60 grams paraformaldehyde, 31.5 grams anhydrous sodium sulfite, 26 grams sodium bisulfite and 10 ml of water. The mixture was heated, triggering an exothermic reaction. Then as this initial reaction subsided, 47 grams phthalic anhydride and 20 grams sodium hydroxide were added. The solution was then refluxed for 30 minutes. The viscosity of the syrup rose rapidly at this point; 50 cc of water was added in order to control the reaction. The reaction mixture was refluxed 10 more minutes, then was ended by adding 100 cc of water.

Agent L was tested in a field sea water mud obtained from South Louisiana which is a natural spud mud. The field mud was treated with 10 lb/bbl of Agent L, heat aged at 200°F. for 16 hours and then tested. The mud and filtrate were recombined and heat aged at 350°F. for 16 hours. The fluid loss characteristics of Agent L are compared with Agent G and Agent H-5 in the field mud. The results are shown in Table X below.

Table X

| AGENTS | A.P.I. F.L. 200°F. | 350°F. |
|---|---|---|
| G | 9.5 | 11.5 |
| H-5 | 6.4 | 8.6 |
| L | 6.7 | 9.8 |
| Base Mud | 55.0 | 98.5 |

Effect of a Catalyst During Sulfonation

EXAMPLE IX

Another procedure for making a sulfonated phenolic resin is to react a phenolsulfonic acid with an aldehyde.

Sulfonic acid groups, which have strong hydrophilic properties, can be introduced into a phenol-aldehyde resin by using a phenolsulfonic acid sodium salt as a starting material. A wide variety of chemical materials may be used as a catalyst for this reaction. Small amounts of toluenesulfonic acid and methanesulfonic acid were used as catalysts in this example. The amount of catalysts used were varied.

Agent M

First, a condensation reaction of p-phenolsulfonic acid sodium salt with formaldehyde was attempted without a catalyst. No appreciable polymerization took place.

Agent N

A combination of two catalysts, toluenesulfonic and methanesulfonic acid was then applied. A three-neck flask fitted with a stirrer, a condenser and a thermometer was charged with 196 grams p-phenolsulfonic acid sodium salt, 162 grams 40% by volume formaldehyde, 9.5 grams toluenesulfonic acid and 4.8 grams methanesulfonic acid. The reaction mixture was refluxed for fifty minutes at 94°C. The viscosity of the syrup was substantially increased at this point, and the reaction was ended by adding 100 cc water. The resulting resin was a pale yellow gel.

Agent O

Another resin was prepared with only one catalyst, toluenesulfonic acid. Into a three-neck flask was charged 196 grams p-phenolsulfonic acid sodium salt, 162 grams 40% formaldehyde and 9.5 grams toluenesulfonic acid. The reaction mixture was then refluxed (at 102°C.) for seventy minutes without adding water. An infusible and insoluble polymer was obtained (Agent O-1). Another reaction was made using the same formula with a slight modification in technique. The reaction mixture was heated and refluxed and turned to a clear solution. After 30 minutes refluxing time (at 103°C.), 25 cc water was added. After refluxing 10 minutes, an additional 25 cc water was added. After 10 minutes, 50 cc more water was added. After refluxing 5 minutes, the reaction was quenched by adding 100 cc of water. Total reaction time was 55 minutes and total amount of water added was 250 cc. The final resin obtained was a syrup coded as Agent O-2. The resin was further modified by shortening the reaction time. After only 20 minutes refluxing time, 25 cc water was added. After another 10 more minutes refluxing, an additional 25 cc water was added. After another 10 minutes refluxing, the reaction was quenched by adding 200 cc water. A very thin syrup was formed. This resin was coded as Agent O-3.

Agent P

Into a reaction flask was weighed 196 grams p-phenolsulfonic acid, 162 grams 40% formaldehyde and 4.8 grams methanesulfonic acid (0.05 mol). The reaction mixture was refluxed at 95°C. for 2 hours. An appreciable viscosity was apparent at this point. The syrup (at 70°C.) has a Brookfield viscosity of 510 cps at 20 rpm. In order to prevent further polymerization, the reaction was quenched by adding 250 cc water. The end product is a thin liquid.

Agent Q

Agent P was modified by increasing the amount of catalyst. Into a reactor was placed 196 grams p-phenolsulfonic acid, 162 grams 40% by volume formaldehyde and 12 grams methanesulfonic acid (⅛ mol). The reaction mixture was refluxed for 25 minutes, then 25 cc water was added. After refluxing for 5 minutes, the viscosity of the resin was substantially increased, and the solution started to gel. The reaction was quenched by adding 225 cc water. The end product was a thick syrup.

Agent R

In order to demonstrate that the amount of catalyst is related to the rate of the reaction, Agent R was prepared with an increased amount of catalyst. Into a reactor, 196 grams p-phenolsulfonic acid sodium salt, 162 grams 40% by volume formalin and 24 grams methanesulfonic acid (¼ mol) were measured. The reaction mixture was heated to reflux and reached a gel point within 10 minutes. The resin was diluted with 250 cc water.

Agent S

Agent O was again modified using salicylic acid in an effort to build a cross-linked polymer. The reactor was charged with 196 grams p-phenolsulfonic acid sodium salt, 40% by volume formaldehyde and 9.5 grams toluenesulfonic acid. Heat was applied to reflux the reaction mixture. After about 10 minutes refluxing, the chemicals were completely dissolved, and a clear yellow solution was obtained. After cooling the reaction to about 70°C., 34.5 grams salicylic acid was added to the reaction mixture. It was refluxed at 104°C. for 20 minutes, then 25 cc water was added; after refluxing at 100°C. for 10 minutes, an additional 25 cc water was added. After refluxing again at 100°C. for 10 minutes, another 50 cc water was added, followed by refluxing again at 99°C. for 10 minutes. The reaction was ended by adding 150 cc water. Total reaction time was 50 minutes and a total of 250 cc water was added. A pale yellow syrup was obtained.

Agent T

Agent O was modified using urea. The reactor was charged with 196 grams p-phenolsulfonic acid sodium salt, 162 grams 40% by volume formaldehyde and 9.5 grams toluenesulfonic acid. The reaction mixture was refluxed for 5 minutes and cooled to 80°C. To this mixture, 30 grams urea was added; a violent reaction immediately followed. The reaction mixture was refluxed at 99°C. for 10 minutes; 25 cc water was added; after refluxing at 99°C. for 5 minutes, 50 cc water was added; after refluxing at 99°C. for 5 minutes, 25 cc additional water was added; after refluxing at 99°C. for 5 minutes, another 25 cc water was added; after refluxing for 5 minutes, the reaction was quenched by adding 150 cc water. A thin yellow syrup resulted.

All physical characteristics of these polymers are summarized in the following Table XI. The agents (10 lb/bbl) were tested in the sea water mud as fluid loss control agents. The results of this test after aging at 150°F. for 16 hours are also included in the table.

Table XI

| AGENTS | CATALYST AND MODIFYING AGENTS | TOTAL REACTION TIME, MIN | THEORETICAL & SOLIDS | pH | BROOKFIELD VISCOSITY (6) 75°C. | 50°C. | 25°C. | API(cc) F.L. |
|---|---|---|---|---|---|---|---|---|
| Agent M | None | 180 | 70.4 | 6.5 | No Polymerization | | | |
| Agent N | 9.5 gr TSA (2) 4.8 gr MSA (3) | 50 | 57.3 | 0.5 | Gel | | | 8.4 |
| Agent O-1 | 9.5 gr TSA | 70 | 42.3 | — | Insoluble Polymer | | | 6.3 |
| Agent O-2 | 9.5 gr TSA | 55 | 42.3 | 0.5 | 90 | 208 | 3,950 | 6.3 |
| Agent O-3 | 9.5 gr TSA | 40 | 42.3 | 0.5 | 7.5 | 11 | 13 | — |
| Agent P | 4.8 gr MSA | 120 | 42.1 | 0.5 | 13 | 20 | 36 | 9.0 |
| Agent Q | 12 gr MSA | 30 | 42.8 | 0.5 | 556 | 775 | 6,730 | 6.3 |
| Agent R | 24 gr MSA | 10 | 34.3 | 0.3 | 1,050 | 4,570 | 35,000 | 5.5 |
| Agent S | 9.5 gr TSA 34 gr SA (4) | 50 | 46.1 | 0.6 | 22 | 72.5 | 5,720 | 8.3 |
| Agent T | 9.5 gr TSA | 25 | 46.0 | 0.6 | 16 | 22 | 75 | 10.7 |

NOTES:
(1) 196 grams of p-phenolsulfonic acid sodium salt and 162 grams 40% formaldehyde are used in each formula.
(2) TSA — Toluenesulfonic Acid
(3) MSA — Methanesulfonic Acid
(4) SA — Salicyclic Acid
(5) The F.L. for the base mud is 33.0 cc.
(6) Measured at 20 rpm, cps.

Acid Catalyzed Reaction

EXAMPLE X

Agent U

The intermediate condensation product was prepared in an acid catalyzed reaction. The reaction was carried out only to such a point that a soluble condensate formed. A 1000 ml resin kettle was equipped with a reflux condenser, a stirrer and a thermometer. To the reaction vessel was added 94 grams (1 mol) of distilled phenol and 100 grams concentrated sulfuric acid. The reaction was refluxed for ½ hour at 80°C., then sufficient 40% NaOH solution was added to raise the pH to 4–4.5. Afterwards, 160 cc of 40% by volume formalin solution was slowly added while the temperature was maintained at 80°C. Then 75 cc additional water was added and the temperature was held at 95°C. for 40 minutes. Then more formaldehyde solution was added dropwise until the proper viscosity was obtained. The viscosity of the final product was above 200 cps. The product was further neutralized using a mild caustic solution and yielding a pH of 8.8 and a viscosity of 5800 cps at 25°C. and 20 rpm.

Agent V

In a 1000 ml three-neck flask fitted with a stirrer and a thermometer, 75 grams of phenol was heated at 100°C. for ½ hour with 100 grams of concentrated sulfuric acid. Then 50 cc of water in 50 cc 40% formaldehyde by volume was added dropwise while maintaining 85°C. Then 100 cc more was added in order to maintain proper viscosity of the polymer and the temperature was kept at 95°C. for 40 minutes. More 40% by volume formaldehyde solution was dropwise added to the mixture until the viscosity of the mixture reached about 200 cps. The acidic mixture was then neutralized to a phenolphathalein end point by adding 120 cc of 40% caustic solution. It was further diluted with water to a total of 725 grams. This reaction product had a very high viscosity (4000 cps at 20 rpm at room temperature).

The effectiveness of Agent V as a drilling fluid additive in conjunction with the sea water mud was illustrated. The sea water mud was treated with 5 and 10 lb/bbl of the resin based on dry basis and an appropriate amount of sodium hydroxide was added. The treated mud was heat aged at 150°F. for 16 hours and properties recorded. The mud was then recombined and heat aged at 250°F. for 16 hours. The heat aged data was then obtained. The mud test results are recorded in the following Table XII.

Table XII

| AGENT V | TEMP. °F. | PV | YP | INITIAL GEL | 10 MIN GEL | pH | A.P.I. F.L. |
|---|---|---|---|---|---|---|---|
| 5 lb/bbl | 150° | 13 | 40 | 26 | 92 | 8.8 | 28.7 |
| | 250° | 9 | 70 | 65 | 160 | 8.3 | 24.0 |
| 10 bbl | 150° | 16 | 29 | 23 | 57 | 8.2 | 22.0 |
| | 250° | 15 | 73 | 61 | 140 | 9.3 | 20.8 |
| Base Mud | 150° | 11 | 26 | 17 | 36 | 7.3 | 38.0 |
| | 250° | 10 | 28 | 21 | 36 | 7.3 | 39.5 |

The table indicates that Agent V shows undesirable results for controlling fluid loss and rheological properties in the sea water mud.

Alkaline Catalyzed Reaction

EXAMPLE XI

Agent W

A reaction vessel was equipped with a mechanical stirrer, a reflux column and thermometer. The flask was charged with 2.5 mols paraformaldehyde, 1.0 mol phenol (loose white crystals) 0.75 mols sodium hydroxide pellets and 100 grams deionized water. Heat was applied to the flask until the materials inside reached about 65°C., when they reacted with one another quite exothermically, rapidly refluxing at near 120°C. When the polymer formed was cooled to 80°–90°C., the flask was submersed in ice water until the resin reached room temperature. (The Cannizzaro reaction caused the consumation of the excess formaldehyde.) A low viscosity, yellow liquid resulted with a pH of 11.2, percent solids, 66.7, percent phenol 47.3.

Agent X

A reaction vessel equipped with a mechanical stirrer, a reflux column and a thermometer was charged with 1 mol phenol, 3 mols paraformaldehyde, 0.55 mols sodium hydroxide and 225 grams deionized water. The mixture was then heated to about 65°C., quickly yielding to a boiling refluxing translucent yellow solution, refluxing at slightly higher than 120°C. When the material in the flask was cooled to 80°–90°C., the flask was submerged into ice water until the resin reached room temperature (the Cannizzaro reaction again). A low viscosity, reddish liquid with a pH of 10.4, percent solids 48.0 resulted; percent phenol 23.0.

Agent Y

A reaction vessel equipped with a mechanical stirrer, a reflux column and a thermometer was charged with 2.0 mols paraformaldehyde, 1.0 mol phenol, 0.25 mol sodium hydroxide and 110 grams deionized water. The mixture was then heated to about 65°C. which initiated an exothermic reaction that quickly caused the temperature to reach around 120°C., the material refluxing rapidly. As the temperature approached 100°-103°C., heat was applied and the mixture was refluxed for 30 minutes. The flask was submerged in ice water when the Cannizzaro reaction consumed the excess formaldehyde. The resulting reddish-yellow resin was of moderate viscosity and was pourable, pH 10.3; percent phenol, 34.3, percent solids, 59.9.

Agent Z

A reaction vessel equipped with a mechanical stirrer, a reflux column and a thermometer was charged with 1.5 mols paraformaldehyde, 1.0 mols phenol, 0.19 mol sodium hydroxide and 110 grams deionized water. The mixture was then heated to about 65°C. which initiated an exothermic reaction that quickly caused the temperature to reach around 120°C., the material refluxing rapidly. As the temperature approached 100°-105°C., heat was applied and the reaction was refluxed for 45 minutes. The flask was submerged into ice water. The resulting polymer turned reddish with time and was of moderate viscosity and was pourable. The pH was 10.3; percent solids, 57.2; and percent phenol, 37.6%.

EXAMPLE XII

Agent AA

A three-neck flask, equipped with a mechanical stirrer, a reflux condenser and a thermometer was charged with 94 grams (1.0 mols) distilled phenol, 75 grams (2.5 mols) paraformaldehyde, 12.5 grams (0.31 mol) sodium hydroxide and 160 ml water. The mixture was heated to 65°C. which initiated an exothermic reaction that quickly caused the temperature to reach 100°-105°C. At that point heat was applied and the reaction refluxed. A clear yellow solution was formed, and this turned to an orange-red resin as the solution refluxed. A series of resins were prepared with variations of refluxing time after the exothermic reaction subsided. After each refluxing, the reaction was ended by submerging the flask in an ice bath so that the Cannizzaro reaction can cause the consumation of any still-available formaldehyde. The viscosity of the resulting resin was then measured using a Brookfield RVF Viscometer at 20 rpm. The resulting polymer was a reddish syrup having 64.5% solids and 32.2% phenol. The variations and observed viscosity are tabulated in Table XIII below.

Table XIII

| AGENTS | REFLUXING TIME, MINS. | REFLUXING TEMP. °C. | pH | cps VISCOSITY |
|---|---|---|---|---|
| AA-1 | 10 | 104.5 | 9.8 | 168 at 22°C. |
| AA-2 | 15 | 105 | 9.8 | 218 at 24°C. |
| AA-3 | 20 | 105.5 | 10.3 | 1,710 at 24°C. |
| AA-4 | 25 | 106 | 10.35 | 12,000 at 24°C. |

The effectiveness of these Agent AA samples as drilling fluid additives in the sea water mud when used in conjunction with sodium hydroxide is illustrated in Table XIV below. The base mud was treated with 10 lb/bbl of resin, based on resin solids and an appropriate amount of sodium hydroxide was added and then tested. The treated mud was heat aged at 150°F. for 16 hours and tested.

Table XIV

| AGENT | INITIAL DATA | | | | | | HEAT AGED DATA | | | | | |
|---|---|---|---|---|---|---|---|---|---|---|---|---|
| | PV | YP | INI GEL | 10 MIN GEL | pH | API FL | PV | YP | INI GEL | 10 MIN GEL | pH | API FL |
| AA-1 | 12 | 66 | 43 | 43 | 9.9 | 57.0 | 8 | 42 | 32 | 57 | 8.6 | 37.5 |
| AA-2 | 14 | 74 | 51 | 55 | 9.7 | 51.0 | 13 | 34 | 37 | 53 | 8.5 | 35.0 |
| AA-3 | 12 | 71 | 48 | 48 | 9.9 | 53.0 | 9 | 32 | 29 | 76 | 8.7 | 36.5 |
| AA-4 | 12 | 66 | 40 | 67 | 9.9 | 47.0 | 9 | 34 | 32 | 113 | 8.8 | 38.0 |
| Base Mud | 10 | 23 | 16 | 25 | 7.4 | 36.6 | 11 | 26 | 17 | 36 | 7.3 | 38.0 |

As the table indicates, these agents did not show favorable results in reducing fluid loss and controlling the rheological properties of the mud.

EXAMPLE XIII

Agent AB

A suitable reaction vessel was charged with 94 grams phenol (1.0 mols), 45 grams paraformaldehyde (1.5 mols), 8 grams sodium hydroxide (0.19 mol) and 110 cc water. The reaction mixture was heated to 65°C. which initiated an exothermic reaction. After the reaction subsided, 69 grams salicylic acid was added to the mixture. The mixture turned to a translucent amber solution upon adding salicylic acid. This mixture was refluxed at 105°C. for 2 hours. A barely pourable syrup having a pH of 4.4 was obtained.

Reaction of Sulfonated Lignite with Phenolic Condensates

The exemplary products of this invention were prepared by complexing a sulfonated lignite with relatively low molecular weight water soluble resins in conjunction with an aldehyde and/or sodium hydroxide.

Because paraformaldehyde is readily available and is convenient to handle, we have used paraformaldehyde as a reactant in the examples below. A fairly wide variation in the extent of complexing and cross-linking can be tolerated. Preferably, the range of an aldehyde to polymeric material may be from 0 to 1.5 mol of an aldehyde per 100 grams reaction solids.

The utility of the improved products can be increased for their specific uses by controlling the ratios of polymers to the sulfonated lignite. The ratio is determined by the extent of reaction and intended end use. This is especially true where they are to be used as fluid loss control agents in drilling muds with different degrees of salinity. The weight ratio range of sulfonated lignite to water soluble polymer preferably ranges between about 10/1 to about 1/10.

The resulting complexes of compound may be further reacted with certain transition metal compounds to form metal-complexes. Non-limiting examples of applicable metal salts include sulfates, chromates, acetates and halides of transition elements. Particularly useful are ferrous sulfate, ferric sulfate, chromous or chromic sulfate, chromous or chromic chloride, chromous or chromic acetate, basic chromium chloride, basic chromium acetate, basic chromium sulfate, potassium chrome alum, manganese sulfate and zinc sulfate, or any combination of two or more of any of the complexing metal salts. Generally, at least 2 percent, preferably 2 to 20 percent, of metal salts can be employed based upon the total weight of the product.

The complexing reaction can be carried out at substantially any temperature including ambient, but proceeds best at elevated temperatures, preferably from about 150°F. to about 450°F. for time period of from 30 minutes to about 10 hours. The reaction pressure can be atmospheric, but again the reaction often proceeds better at elevated pressure, such as, 50 to 500 psig.

EXAMPLE XIV

The sulfonated lignite containing 29.0% solids and 6.8% sulfur based on weight is utilized for complexing with various water soluble polymers. This sulfonated lignite has 100% water solubility or suspendability and a pH of 9.3. The finished products were prepared by complexing this sulfonated lignite with various agents using the same method. Into a three-neck flask equipped with a stirrer and a condenser were charged 345 grams sulfonated lignite slurry containing 100 grams solids and specified amounts of resin which is equivalent to 100 grams resin solids, the mixture was refluxed for 3 hours. The weight ratio of sulfonated lignite and the resin was maintained at 1:1. Some samples contain sodium hydroxide because of the low pH of the resin. The variables are listed in Table XV. All samples were spray dried. The table also includes the viscosity of the finished products before spry drying measured at room temperature.

was refluxed for 3 hours. The finished product had a pH of 8.6 and was spray dried. The weight ratio of sulfonated lignite to the resin was 1:1.2.

Additive 4 was further reacted at 300°F. for 3 hours in a pressure vessel. The end product having a pH of 8.7 was a pourable liquid and was spray dried. This is cooled as Additive 4-2.

Additive 5

A complexed sulfonated lignite with Agent D was prepared without adding paraformaldehyde according to the procedure described for Additive 4. Additive 5 was prepared in order to demonstrate the effects of cross-linking between sulfonated lignite and the resin.

Additive 6

Additive 4 was further modified by reacting a chelating metal salt, chromium sulfate [$Cr_2(SO_4)_3 \cdot nH_2O$] containing 20% chromium. In a pressure vessel were placed 340 grams of Additive 4 and 8 grams of chromium sulfate. These were reacted for four hours at 300°F. The end products were a semi-solid gel having a pH of 7.5.

Additive 9

Into a suitable reactor were charged 455 grams sulfonated lignite containing 33% solids, 240 grams Agent E-5 containing 75.6% resin, 20 grams paraformaldehyde and 145 cc water. The reaction mixture was refluxed for 3 hours. The end product was a pourable liquid. The weight ratio of sulfonated lignite to the resin was 1:1.2.

Additive 10

In this formula Agent E-5 is substituted for Agent D in the formula of Additive 4. Into a suitable reactor equipped with a stirrer and reflux condenser were charged 600 grams of sulfonated lignite containing 23.8% solids, 300 grams Agent E-5 containing 75.6% resins solids, and 20 grams paraformaldehyde. The mixture was refluxed for three hours. The finished product was slightly gelled after overnight aging. The pH was 9.2. The weight ratio of the sulfonated lignite to the resin was 1:1.5.

Additive 11

Into a pressure vessel were charged 405 grams Addi-

Table XV

| ADDITIVES | AGENTS | AMOUNTS OF RESINS (GRAMS) | pH | BROOKFIELD VISCOSITY CPS at 20 RPM | NOTES |
|---|---|---|---|---|---|
| 1 | Agent A-5 | 227 | 8.6 | 100 | |
| 2 | Agent B | 227 | 9.5 | 20 | |
| 3 | Agent C | 247 | 8.3 | 30,000 | |
| 7 | Agent E-4 | 213 | 8.0 | 80 | |
| 8 | Agent E-5 | 213 | 7.9 | 50 | |
| 14 | Agent H-1 | 211 | 9.0 | 145,000 | |
| 15 | Agent H-2 | 211 | 9.4 | 38,400 | |
| 16 | Agent H-3 | 211 | 9.2 | 90,000 | |
| 17 | Agent H-4 | 211 | 9.4 | 17,000 | |
| 21 | Agent O-2 | 233 | 10.4 | 70 | 25 gr NaOH |
| 22 | Agent Q | 233 | 9.2 | 75 | 25 gr NaOH |
| 23 | Agent R | 231 | 9.8 | 1,225 | 25 gr NaOH |
| 29 | Agent U | 211 | 9.4 | 20 | |

EXAMPLE XV

Additive 4

A three-neck flask equipped with a mechanical stirrer, a condenser and a thermometer was charged with 780 grams of sulfonated lignite slurry containing 23.8% solids and 335 grams of Agent D containing 68% resin solids and the reaction mixture was stirred until a homogeneous mixture was obtained. To the mixture, 20 grams of paraformaldehyde was added, and the mixture tive 10 (37% solids, the ratio of the resin to sulfonated lignite being 1.5), 8 grams chromium sulfate containing 20% chromium, 8 grams sodium hydroxide and 150 cc water. The mixture was reacted for 2½ hours at 150°C. The finished product was spray dried.

Additive 12

A new product was prepared by utilizing two water soluble resins. Into a resin kettle were charged 800 grams of sulfonated lignite containing 23.8% solids, 300 grams Agent D, 200 grams Agent V and 20 grams paraformaldehyde. The mixture was refluxed for 3 hours. The resulting product having a pH of 9.2 was spray dried and coded as Additive 12-1.

Addivite 12-1 was further reacted for 3 hours at 300°F. in a pressure vessel. The resulting product was a pourable liquid having a pH of 9.2. This was spray dried and coded as Additive 12-2.

Additive 13

This was a chromium complexed Additive 12. Into a pressure vessel were charged 400 grams Additive 12-1 and 8 grams chromium sulfate. The reaction mixture was reacted for 3 hours at 300°F. The finished product was a mild gel having a pH of 7.8.

Additive 18

Into a suitable resin kettle were charged 800 grams sulfonated lignite containing 23.8% solids, 283 grams Agent H-5 and 20 grams paraformaldehyde. The mixture was refluxed for 2.5 hours. The finished product was a homogeneous liquid having a pH of 10.4. The spray dried powder was coded as Additive 18-1. The weight ratio of sulfonated lignite to the resin in this formula was 1.5:1. This is the preferred additive of this invention.

The refluxed mixture was then further reacted at 300°F. for 3 hours in a pressure vessel. The end product was a fairly thin liquid having a pH of 9.4. The spray dried product was coded as Additive 18-2.

Additive 19

The refluxed mixture of Additive 18-1 was further reacted with a chromium salt at high temperature and high pressure conditions. Into a pressure vessel were charged 350 grams Additive 18-1 and 10 grams chromium sulfate and the reaction mixture was reacted at 300°F. for 3 hours. The finished product was spray dried.

Additive 20

Additive 18 was slightly modified using the weight ratio 1:1 of sulfonated lignite to the resin. Into a suitable reactor were charged 210 grams Agent H-5 (100 gram solids), 345 grams sulfonated lignite (29% solids, actual solid 100 grams), 20 grams paraformaldehyde and 100 cc water. The reaction mixture was refluxed for 3 hours and then spray dried.

Additive 24

In order to demonstrate the effect of a one step reaction in preparing a finished product, Additive 24 was prepared as follows: Into a three-neck flask were placed 196 grams p-phenolsulfonic acid sodium salt, 150 grams 40% formaldehyde and 9.5 grams toluenesolfonic acid. The mixture was heated while stirring. When the mixture was completely dissolved, 34.5 grams salicylic acid was added, and the mixture was refluxed for 2 hours. The viscosity of the resin was substantially high at this time. After the resin cooled to about 50°C., 600 grams of sulfonated lignite containing 24% solids was added. The mixture was then refluxed for 1 hour. The finished product was a pourable liquid having a pH of 4.85. The product was spray-dried.

Additive 25

A sulfonated phenolic resin was first prepared by using p-phenolsulfonic acid sodium salt (Agent N) and the resin was complexed with sulfonated lignite. Into a suitable reactor were charged 420 grams sulfonated lignite containing 24% solids, 134 grams Agent N and 15 grams paraformaldehyde and the mixture was refluxed for 3 hours. The end product was a fairly thin fluid having a pH of 8.7. The weight ratio of sulfonated lignite to the resin was 1:0.77. The product was spray dried.

Additive 26

A mixture of 134 grams Agent N, 420 grams sulfonated lignite containing 24% solids, 15 grams paraformaldehyde and 10 grams chromium sulfate was vigorously agitated in a Waring Blender and transferred into a reactor. The reaction mixture was refluxed for 2 hours. 600 cc water was added to the mixture in order to control the viscosity, and was continued to reflux for 30 minutes. The finished product was still a gel despite the addition of a large amount of water. The gel had a pH of 6.5.

Additive 27

Two different resins were complexed with sulfonated lignite. Into a suitable reactor were charged 420 grams sulfonated lignite containing 23.8% solids, 80 grams Agent V, 70 grams Agent H-5, 20 grams paraformaldehyde and 100 cc water. The mixture was refluxed for 3 hours. The finished product was spray dried. The finished product before spray drying had a viscosity of 38,000 cps at 20 rpm at room temperature.

Additive 28

A product was prepared in a one step process in order to demonstrate the versatility of this invention. Into a three-neck flask equipped with a stirrer and a condenser were charged 94 grams phenol, 60 grams paraformaldehyde, 32 grams anhydrous sodium sulfite, 26 grams sodium sulfite and 18 cc water. The mixture was heated to 75°C. which initiated an exothermic reaction that quickly caused the temperature to reach 128°C., the material refluxing rapidly. Then, 35 grams salicylic acid and 15 grams urea were added, the mixture was refluxed for 30 minutes and 50 cc water was added. After refluxing for 10 minutes, 420 grams sulfonated lignite containing 23.8% solids was added and the mixture was refluxed for 3 hours. The finished product was spray dried.

EXAMPLE XVI

Various polymethylol phenol condensates prepared under alkaline conditions and acid condensates were complexed with sulfonated lignite samples under various conditions. Three sulfonated lignite samples, in which the only differences was solids content, were used for the complexing reaction. In some cases, additional water was necessary to control viscosity and sodium hydroxide was used to raise the pH of the finished product. The weight ratio of sulfonated lignite to the resin was also varied to formulate different products for specific end use. When polymethylol phenols were complexed, no additional aldehydes were added because the resins contained some unreacted aldehydes. When acid condensates were used, small amounts of paraformaldehyde (20 grams for Additives 29, 30 and 31; 10 grams for Additive 32) were added to the mixture. The reaction was carried out in a three-neck flask equipped with a stirrer and condenser by refluxing indicated amounts of sulfonated lignite with an indicated resin for 2.5 to 3 hours. The finished product was first evaluated by checking pH and viscosity. All the variables are listed in Table II.

Table XVI

| ADDI-TIVES | RESINS | | AMOUNTS OF RESINS (GRAMS) | % SOLIDS | SULFONATED LIGNITE WEIGHTS ADDED (ccs) | WATER ADDED (ccs) | NaOH ADDED (GRAMS) | REACTION TIME MIN | pH | BROOKFIELD VISCOSITY CPS | ** RATIO |
|---|---|---|---|---|---|---|---|---|---|---|---|
| 29 | Agent | U | 211 | 29.0 | 345 | 125 | — | 180 | 9.4 | 20 | 1:1 |
| 30 | Agent | V | 265 | 29.0 | 345 | 125 | — | 180 | 8.2 | 47 | 1:1 |
| 31 | | V | 133 | 29.0 | 345 | 125 | — | 180 | 8.4 | 100 | 2:1 |
| 32 | | V | 265 | 29.0 | 173 | 125 | — | 180 | 8.2 | 10 | 1:2 |
| 33 | | W | 62 | 23.8 | 600 | — | 9.0 | 45* | 12.9 | — | 1:1.34 |
| 34 | | X | 131 | 23.8 | 600 | — | 11.0 | 180* | 12.3 | — | 1:2.35 |
| 35 | | Y | 83 | 23.8 | 600 | — | 11.0 | 180 | 11.3 | — | 1:3.0 |
| 36 | | Z | 83 | 33.0 | 455 | — | — | 180 | 11.0 | gel | 1:3.0 |
| 37 | | AA-1 | 83 | 29.0 | 455 | 150 | — | 150 | 10.7 | 1,400 | 1:2.35 |
| 38 | | AA-2 | 87 | 33.0 | 455 | — | — | 150 | 10.5 | gel | 1:2.35 |
| 39 | | AA-2 | 87 | 29.0 | 455 | 150 | — | 150 | 11.8 | 13,750 | 1:2.35 |
| 40 | | AA-2 | 83 | 29.0 | 173 | 150 | — | 15 | 10.4 | 1,030 | 1:1 |
| 41*** | | AA-2 | 83 | 29.0 | 173 | 150 | — | 2 | 10.1 | 600 | 1:1 |
| 42 | | AA-3 | 87 | 29.0 | 455 | 150 | — | 150 | 10.3 | 14,750 | 1:2.35 |
| 43 | | AA-4 | 87 | 29.0 | 455 | 150 | — | 150 | 10.9 | 72,000 | 1:2.35 |
| 44 | | AB | 85 | 29.0 | 455 | 200 | 15.0 | 180 | 12.0 | 15 | 1:2.35 |
| 45*** | | J | 217 | 29.0 | 345 | 125 | — | 90 | 8.4 | gel | 1:1 |
| 46*** | | K | 226 | 29.0 | 345 | 225 | — | 90 | 8.0 | gel | 1:1 |

*The reaction was carried out in a pressure vessel at 150°C.
**The weight ratio of sulfonated lignite to the resin.
***20 grams paraformaldehyde was added before the reaction.

Effectiveness of Additives in Laboratory Sea Water

The products of our invention were tested in the laboratory sea water mud in which 110 lb/bbl bentonite was dispersed and aged in synthetic sea water. The mud was treated with an indicated amount of additive and an appropriate amount of sodium hydroxide and was heat aged at 250°F. for 16 hours. The muds properties were measured, then the mud and filtrate were recombined and heat aged at 350°F. for 16 hours. The final properties were measured. The performance results are summarized in Tables XVII and XVIII. The muds recorded in Table XVIII were treated with 10 lb/bbl of additive.

Table XVII

| ADDI-TIVES | LB/BBL | 250°F. | | | | 350°F. | | | |
|---|---|---|---|---|---|---|---|---|---|
| | | P.V. | Y.P. | GELS* | API F.L. | P.V. | Y.P. | GELS* | API F.L. |
| 4-1 | 5 | 19 | 6 | 4/11 | 24.8 | 18 | 32 | 28/53 | 13.4 |
| | 10 | 13 | 4 | 4/8 | 21.0 | 13 | 13 | 9/28 | 10.8 |
| 4-2 | 5 | 18 | 8 | 3/15 | 10.8 | 14 | 35 | 30/51 | 11.1 |
| | 10 | 15 | 5 | 1/11 | 6.6 | 15 | 15 | 10/26 | 9.2 |
| 6 | 5 | 21 | 7 | 1/5 | 8.2 | 12 | 32 | 20/42 | 12.1 |
| | 10 | 26 | 6 | 0/13 | 6.9 | 24 | 42 | 36/60 | 10.3 |
| 9 | 10 | 15 | 2 | 1/7 | 9.2 | 12 | 21 | 18/37 | 15.2 |
| 10 | 5 | 20 | 13 | 6/22 | 13/7 | 14 | 50 | 45/72 | 15.2 |
| | 10 | 16 | 5 | 2/14 | 5.2 | 13 | 37 | 34/57 | 8.7 |
| 11 | 10 | 14 | 5 | 2/10 | 8.0 | 13 | 13 | 6/27 | 12.7 |
| 12-1 | 5 | 21 | 9 | 5/16 | 24.7 | 17 | 46 | 33/44 | 33.8 |
| | 10 | 19 | 7 | 3/18 | 10.4 | 19 | 31 | 33/71 | 10.4 |
| 12-2 | 5 | 19 | 12 | 5/18 | 21.5 | 15 | 47 | 38/58 | 25.4 |
| | 10 | 20 | 8 | 3/15 | 8.6 | 16 | 48 | 43/48 | 10.0 |
| 13 | 5 | 13 | 9 | 3/12 | 23.4 | 12 | 34 | 30/34 | 24.4 |
| | 10 | 18 | 3 | 2/7 | 8.5 | 13 | 28 | 21/30 | 12.5 |
| 18-1 | 5 | 13 | 4 | 2/6 | 25.0 | 14 | 9 | 8/18 | 26.7 |
| | 10 | 10 | 6 | 3/8 | 13.0 | 12 | 18 | 12/36 | 13.8 |
| 18-2 | 5 | 13 | 5 | 3/10 | 20.7 | 11 | 21 | 15/43 | 24.9 |
| | 10 | 12 | 5 | 4/16 | 14.9 | 12 | 21 | 18/32 | 18.0 |
| 19 | 5 | 12 | 5 | 3/14 | 21.5 | 11 | 18 | 13/34 | 27.9 |
| | 10 | 21 | 5 | 1/9 | 8.7 | 18 | 12 | 5/37 | 11.7 |
| 20 | 5 | 14 | 7 | 4/16 | 22.5 | 14 | 24 | 16/24 | 13.4 |
| | 10 | 13 | 5 | 1/13 | 8.9 | 14 | 20 | 16/20 | 11.0 |
| 24 | 5 | 11 | 5 | 4/7 | 38.0 | 13 | 15 | 16/20 | 35.0 |
| | 10 | 12 | 6 | 5/9 | 10.9 | 13 | 14 | 14/20 | 15.9 |
| 25 | 5 | 13 | 5 | 5/12 | 25.5 | 13 | 15 | 12/22 | 35.9 |
| | 10 | 17 | 11 | 5/21 | 9.6 | 15 | 33 | 24/52 | 14.9 |
| 26 | 5 | 11 | 9 | 5/15 | 35.5 | 10 | 25 | 24/25 | 38.8 |
| | 10 | 12 | 28 | 2/16 | 8.9 | 9 | 5 | 1/14 | 11.1 |
| 27 | 5 | 19 | 16 | 8/23 | 19.6 | 15 | 48 | 39/62 | 21.5 |
| | 10 | 18 | 8 | 3/18 | 5.6 | 18 | 37 | 31/33 | 12.7 |
| 28 | 5 | 24 | 8 | 6/15 | 26.0 | 19 | 48 | 47/48 | 40.0 |
| | 10 | 24 | 10 | 7/14 | 8.4 | 10 | 2 | 2/9 | 9.0 |
| 35 | 10 | 15 | 2 | 1/14 | 10.1 | 10 | 23 | 24/24 | 13.1 |
| 36 | 10 | 15 | 3 | 1/12 | 12.4 | 9 | 23 | 21/42 | 14.7 |
| 38 | 10 | 19 | 2 | 1/13 | 7.8 | 13 | 25 | 25/25 | 10.5 |
| Base Mud | — | 10 | 23 | 22/72 | 41.6 | 10 | 60 | 55/103 | 47.1 |

*Initial gel/10 min. gel

Table XVIII

| ADDITIVES | 250°F. | | | | 350°F. | | | |
|---|---|---|---|---|---|---|---|---|
| | P.V. | V.P. | GELS* | API F.L. | P.V. | Y.P. | GELS* | API F.L |
| 1 | 17 | 2 | 2/17 | 7.7 | 14 | 24 | 18/38 | 10.0 |
| 2 | 16 | 6 | 4/26 | 35.0 | 12 | 25 | 24/26 | 38.5 |
| 3 | 27 | 35 | 16/60 | 10.2 | 21 | 82 | 66/140 | 13.4 |
| 7 | 17 | 2 | 2/10 | 8.6 | 15 | 23 | 14/31 | 9.3 |
| 8 | 18 | 4 | 1/12 | 7.3 | 16 | 26 | 21/41 | 8.9 |
| 14 | 21 | 7 | 2/15 | 8.2 | 10 | 24 | 28/28 | 13.8 |
| 15 | 15 | 8 | 5/19 | 7.5 | 15 | 32 | 36/61 | 12.6 |
| 16 | 18 | 8 | 3/16 | 7.5 | 12 | 27 | 25/52 | 10.8 |
| 17 | 17 | 9 | 4/18 | 7.2 | 16 | 51 | 47/47 | 8.6 |
| 21 | 16 | 8 | 6/22 | 11.8 | 12 | 35 | 32/32 | 26.0 |
| 22 | 15 | 10 | 5/27 | 14.5 | 13 | 37 | 36/41 | 16.1 |
| 23 | 13 | 8 | 4/17 | 12.3 | 12 | 30 | 27/29 | 23.4 |
| 30 | 18 | 6 | 1/13 | 10.3 | 14 | 25 | 19/34 | 12.0 |
| 31 | 16 | 11 | 6/17 | 11.7 | 13 | 37 | 31/35 | 16.1 |
| 32 | 17 | 5 | 2/14 | 11.3 | 13 | 21 | 14/36 | 13.2 |
| 37 | 28 | 22 | 12/70 | 8.4 | 17 | 46 | 35/65 | 9.5 |
| 39 | 19 | 11 | 3/30 | 7.7 | 14 | 31 | 28/31 | 8.5 |
| 40 | 21 | 55 | 28/63 | 17.7 | 19 | 65 | 57/87 | 18.5 |
| 41 | 17 | 26 | 13/28 | 26.5 | 14 | 51 | 46/81 | 26.0 |
| 42 | 29 | 21 | 8/54 | 9.1 | 18 | 35 | 37/48 | 10.2 |
| 43 | 22 | 30 | 14/13 | 9.7 | 16 | 43 | 41/55 | 10.3 |
| 45 | 16 | 8 | 1/14 | 7.0 | 12 | 25 | 19/41 | 9.0 |
| 46 | 19 | 6 | 1/4 | 6.8 | 18 | 27 | 17/32 | 9.0 |
| 27 | 17 | 9 | 4/21 | 11.5 | 11 | 30 | 33/56 | 10.8 |
| Sulfonated Lignite | 16 | 4 | 2/14 | 17.4 | 12 | 18 | 11/42 | 17.8 |
| Base Mud | 9 | 21 | 17/52 | 45.3 | 11 | 50 | 50/113 | 50.0 |

*Initial gel/10 min. gel

The mud performance of Additives 1, 2 and 3 is shown in Table VXIII; it clearly indicates that the characteristics of resins (Agents A-5, B and C) are directly related to the performance of finished additives. Additives 2 and 3 are a complex of sulfonated lignite and Agents B and C respectively. In preparing water soluble resins, the formula for the Agent A system has an optimum amount of the sulfites and bisulfites. Formulas for Agents B and C have extreme ranges of sulfites and bisulfites. At these extreme ranges, at least one of the modifying reagents described above should be used. Thus, when the salt of sulfurous acid (e.g., sodium sulfite and sodium bisulfite) is in the range of 0.25 to 0.75 mol per mol of phenolic material, fluid loss control can usually be obtained without a modifying reagent although the use of the latter improves the control. However, when the amount of the salt of sulfurous acid is higher or lower than this range, the use of a modifying reagent as described herein will result in a product that will reduce fluid loss.

The test results of Additives 14, 15, 16 and 17 in sea water mud are shown in Table XVIII, which also indicates that the properties of resins are closely related to the mud properties of their complexed products.

In general, the final additives have improvements in properties over the phenolic condensates alone, sulfonated lignites alone or the base mud. These improvements are in thinning (deflocculation), gel strength reduction, fluid loss control and thermal stability.

Selected samples were tested in the sea water mud system at high temperature range in order to demonstrate their thermal stability. The sea water mud was treated with 10 lb/bbl of additives and was heat aged at 350°F. The API F.L. was measured. The mud and filtrate were recombined, heat aged at 400°F. for 16 hours and tested. The results are recorded in Table XIX. These results show that these additives remain effective over a wide range of temperatures.

Table XIX

| ADDITIVES | API F.L. | |
|---|---|---|
| | 350°F. | 400°F. |
| 4 | 11.9 | 16.0 |
| 4-2 | 7.2 | 14.0 |
| 6 | 10.1 | 16.0 |
| Base Mud | 45.9 | 46.9 |

Effect of Additives in Modified Laboratory Sea Water

EXAMPLE XVII

Small amounts of complexed products in a modified sea water mud in which the original mud was diluted to 9.4 lb/gal and the diluted mud was treated with 1.5 lb/bbl C.M.C. (carbomothoxy cellulose) and 0.5 lb/bbl sodium hydroxide result in a significant decrease in the fluid loss and favorable mud properties. The modified sea water mud was treated with 3 lb/bbl of the additive and was heat aged at 250°F. for 16 hours. The final properties are recorded in Table XX. The results in Table XX show that Additive 5, which was complexed without an aldehyde, does not have a fluid loss control as good as Additive 4 in which an aldehyde is used as a cross-linking agent. This proves that the aldehyde added to Agent 4 plays an important role in order to improve its fluid loss control property.

Table XX

| ADDITIVES | P.V. | Y.P. | API INITIAL GEL | 10 MIN GEL | F.L. |
|---|---|---|---|---|---|
| 4 | 19 | 7 | 3 | 11 | 9.1 |
| 4-2 | 27 | 11 | 2 | 8 | 8.3 |
| 5 | 14 | 3 | 7 | 20 | 27.3 |
| 6 | 27 | 18 | 4 | 19 | 8.3 |
| 10 | 16 | 6 | 1 | 13 | 8.2 |
| 12-1 | 30 | 13 | 2 | 17 | 8.2 |
| 12-2 | 19 | 9 | 2 | 17 | 7.9 |
| 13 | 17 | 10 | 2 | 10 | 9.9 |
| 18-1 | 9 | 9 | 7 | 13 | 10.4 |
| 18-2 | 19 | 4 | 0 | 14 | 9.6 |
| 24 | 24 | 12 | 3 | 13 | 9.8 |
| 25 | 12 | 28 | 2 | 16 | 8.9 |
| 26 | 21 | 9 | 2 | 8 | 10.4 |

Table XX-continued

| ADDITIVES | P.V. | Y.P. | API INITIAL GEL | 10 MIN GEL | F.L. |
|---|---|---|---|---|---|
| 28 | 24 | 10 | 2 | 14 | 8.4 |
| 33 | 29 | 13 | 3 | 20 | 9.4 |
| 34 | 24 | 16 | 3 | 19 | 10.0 |
| 35 | 25 | 12 | 3 | 18 | 9.0 |
| Base Mud | 22 | 8 | 2 | 4 | 22.4 |

The modified sea water mud, treated with 1.5 lb/bbl C.M.C. and 0.5 lb/bbl sodium hydroxide is used to demonstrate the favorable effects of our invention products and the adverse effect of conventional drilling fluid additives such as C.M.C. and Cr-lignosulfonate.

This mud was treated with 3 lb/bbl of additive and was heat aged at 250°F. for 16 hours. The mud was treated with an additional 5 lb/bbl of additive and then heat aged at 350°F. for 16 hours. The mud properties obtained after aging 250°F. and 350°F. are compared in Table XXI. The carbomethoxy cellulose is a chemically altered cellulose which is widely used in drilling practice. The Cr-lignosulfonate is prepared by reacting a commercially available calcium lignosulfonate with sodium dichromate. This Cr-lignosulfonate has also been widely used as a drilling fluid additive for a long time. The data in Table XXI indicates that all muds after heat aging at 250°F. maintain favorable mud properties, but, the base mud, which contains C.M.C., and the mud treated with Cr-lignosulfonate after heat aging at 350°F. fail to maintain good properties. This is a strong indication that our invention products are heat stable. The mud treated with C.M.C. or Cr-lignosulfonate totally fails to control fluid loss after heat aging at 350°F. as shown in the table below.

sure fluid loss characteristics. The relationship of time to high temperature-high pressure fluid loss measured at 300°F. and at a constant pressure 500 psi was compared. The results indicate that these muds, which have been subjected to 16 hours at 250°F. and 16 hours at 350°F. previously to this test, remained in excellent condition and showed excellent high temperature-high pressure fluid loss characteristics.

Effect of Additives in Field Sea Water

EXAMPLE XVIII

The effectiveness of Additive 27 in the field sea water mud of various concentrations was tested. The effect on viscosity, gel strength and fluid loss reduction in this mud before and after heat aging at 220°F for 16 hours is shown in Table XXII.

Table XXII

| CONCENTRATION LB/BBL | A.V.* | | 10 MIN GEL | | API F.L. cc | |
|---|---|---|---|---|---|---|
| | INITIAL | AGED | INITIAL | AGED | INITIAL | AGED |
| 2 | 10 | 6 | 13 | 6 | 77.0 | 60.0 |
| 4 | 8 | 6 | 14 | 4 | 59.8 | 43.0 |
| 6 | 8 | 5 | 10 | 2 | 34.0 | 14.0 |
| 8 | 7 | 5 | 6 | 0 | 12.0 | 7.8 |
| 10 | 7 | 5 | 2 | 0 | 7.6 | 6.5 |
| Base Mud | 21 | 16 | 24 | 16 | 90.0 | 81.0 |

*Apparent viscosity expressed as cps.

In the field sea water mud, Additive 27 affected the viscosity and gel strength and reduced fluid loss substantially. The addition of 6 lb/bbl of Additive 27 reduced the fluid loss from 81 cc to 14 cc. After heat aging, at the same time the viscosity and gel strength were decreased substantially. A 6 lb/bbl treatment appears to be adequate for this mud.

Effect of Additives in Gyp Fluid

EXAMPLE XIX

A comparison of the properties of our invention additives, sulfonated lignite and Cr-lignosulfonate on the properties of the gyp mud in which 3 lb/bbl of product was treated is shown in Table XIV.

This experiment was performed to demonstrate that these invention products have good fluid loss control in a fresh water system at low chemical concentration. The results shown in Table XXIII indicate Agent 20

Table XXI

| ADDITIVES | P.V. | Y.P. | 250°F. GELS | API F.L. | P.V. | Y.P. | 350°F. GELS | API F.L. |
|---|---|---|---|---|---|---|---|---|
| 4-2 | 27 | 11 | 2/8 | 8.3 | 9 | 1 | 1/7 | 7.9 |
| 6 | 27 | 18 | 4/19 | 8.3 | 15 | 0 | 0/5 | 7.7 |
| 10 | 16 | 6 | 1/13 | 8.2 | 9 | 4 | 2/12 | 6.9 |
| 12-1 | 30 | 13 | 2/17 | 8.2 | 14 | 0 | 0/12 | 9.0 |
| 12-2 | 19 | 9 | 2/12 | 7.9 | 18 | 6 | 2/11 | 11.2 |
| 25 | 12 | 28 | 2/16 | 8.9 | 9 | 5 | 1/14 | 11.1 |
| 28 | 24 | 10 | 2/14 | 8.4 | 10 | 2 | 2/9 | 9.0 |
| Cr-Lignosulfonate | 29 | 14 | 3/16 | 8.8 | 7 | 5 | 1/7 | 40.0 |
| Base Mud | 22 | 8 | 2/14 | 12.4 | 8 | 16 | 11/19 | 55.0 |

These mud samples left over from tests in Table XXI were rechecked for their high temperature-high pressure and 28 are superior to sulfonated lignite or Cr-lignosulfonate.

Table XXIII

| PRODUCTS | P.V. | Y.P. | 250°F. GELS | API F.L. | P.V. | Y.P. | 350°F. GELS | API F.L. |
|---|---|---|---|---|---|---|---|---|
| Additive 20 | 12 | 23 | 21/47 | 16.8 | 16 | 6 | 1/41 | 14.6 |
| Additive 28 | 17 | 20 | 13/36 | 11.5 | 26 | 21 | 3/41 | 8.0 |

TAble Table -continued

| PRODUCTS | P.V. | Y.P. | 250°F. GELS | API F.L. | P.V. | Y.P. | 350°F. GELS | |
|---|---|---|---|---|---|---|---|---|
| Sulfonated Lignite | 15 | 14 | 14/34 | 25.0 | 18 | 25 | 25/40 | 27.0 |
| Cr-Lignosulfonate | 14 | 55 | 35/55 | 36.3 | 12 | 16 | 8/16 | 38.8 |
| Base Mud | 11 | 45 | 60/76 | 36.0 | 10 | 20 | 27/88 | 39.3 |

Physical Mixture of Phenolic Condensate and Reaction Product

EXAMPLE XX

The effect of uncomplexed resins (Agent H-5) and combinations of uncomplexed and complexed products and complexed products only on fluid loss reduction, yield point and gel strength of this mud are shown in Table XXIV. The mud was treated with indicated amounts of chemicals and were heat aged at 250°F. for 16 hours. The mud properties were recorded after the mud was cooled to room temperature. The mud and filtrate were then combined, heat aged at 350°F. for 16 hours, and the mud properties were again measured.

lignite in which the ratio of two ingredients can be varied is to control the rheology of the mud. Since sulfonated lignite is a good thinner in salt water mud, the field sea water mud was weighed up to 16 lg/gal by using barite and then treating with indicated amounts of chemicals and sodium hydroxide. The mud was heat aged at 300°F. for 16 hours and the properties were recorded. The mud and filtrate were then combined and heat aged again at 400°F. for 16 hours in order to determine their thermal stability in the mud.

As shown in Table XXV, the mud treated with complexed product (additive) and sulfonated lignite shows Table XXV

| TESTS | CONCT. LB/BBL | 300°F. | | | | 400°F. | | | |
|---|---|---|---|---|---|---|---|---|---|
| | | P.V. | Y.P. | MIN GEL | API F.L. | P.V. | Y.P. | 10 MIN GEL | API F.L. |
| Additive 17 | 10 | 14 | 9 | 19 | 3.9 | 13 | 90 | 79 | 11.5 |
| Additive 17/S.L.* | 6/4 | 17 | 0 | 11 | 4.5 | 18 | 17 | 28 | 8.5 |
| Additive 18 | 10 | 13 | 3 | 14 | 11.5 | 12 | 34 | 34 | 8.5 |
| Additive 18/S.L. | 6/4 | 17 | 0 | 11 | 9.8 | 16 | 13 | 23 | 7.5 |
| Additive 20 | 10 | 17 | 9 | 21 | 6.6 | 16 | 98 | 92 | 14.2 |
| Additive 20/S.L. | 6/4 | 13 | 2 | 13 | 6.8 | 14 | 22 | 33 | 9.0 |
| Additive 27 | 10 | 14 | 1 | 8 | 5.7 | 14 | 24 | 30 | 13.0 |
| Additive 27/S.L. | 6/4 | 18 | 0 | 8 | 6.3 | 17 | 19 | 27 | 11.4 |
| Additive 28 | 10 | 11 | 12 | 19 | 18.5 | 12 | 106 | 84 | 14.9 |
| Additive 28/S.L. | 6/4 | 13 | 0 | 13 | 19.0 | 12 | 41 | 33 | 14.6 |
| Additive 46 | 10 | 18 | 0 | 6 | 5.7 | 15 | 39 | 52 | 15.9 |
| Additive 46/S.L. | 6/4 | 14 | 1 | 7 | 6.5 | 14 | 28 | 37 | 9.8 |
| Blank | — | 12 | 24 | 23 | 61.0 | 12 | 87 | 50 | 70.0 |

*S.L. = Sulfonated Lignite

Table XXIV

| AGENTS | CONCT. LB/BBL | YP | 250°F. 10 MIN GEL | API F.L. | YP | 350°F. 10 MIN GEL | API F.L. |
|---|---|---|---|---|---|---|---|
| Agent H-5 | 10 | 4 | 9 | 6.4 | 32 | 33 | 8.6 |
| Additive 27 | 10 | 1 | 4 | 6.0 | 2 | 5 | 10.0 |
| Agent H-5 | 5 | | | | | | |
| Additive 27 | 5 | 1 | 6 | 7.0 | 13 | 35 | 9.5 |
| Agent H-5 | 5 | | | | | | |
| Additive 28 | 5 | 4 | 6 | 6.8 | 20 | 25 | 9.5 |
| Agent H-5 | 5 | | | | | | |
| Additive 28 | 5 | 4 | 7 | 6.9 | 21 | 27 | 10.0 |
| Base Mud | | 14 | 12 | 55.0 | 20 | 21 | 98.5 |

Table XXIV shows that Agent H-5 has a slight adverse effect on the yield point and gel strength at 350°F., but reduced the fluid loss from 98.5 cc to 8.6 cc. It is clearly shown that the addition of 10 lb/bbl of Additive 27 to this mud does improve the rheological properties of this mud considerably at 350°F. while maintaining excellent fluid loss control property. The combination of uncomplexed resin and additive control exhibited excellent fluid loss control over a wide range of heat aging temperatures; however, other rheological properties were not as good as the additive alone.

Physical Mixture of Sulfonated Lignite and Reaction Product

The advantage of using both additives and sulfonated significant advantage in controlling rheological properties over the mud treated with one additive. It is clearly shown in the table that the mud treated with both ingredients has better thinning action and gel strength reduction than the mud treated with one additive. All muds show excellent fluid loss control over a wide range of heat aging.

Physical Mixture of Sulfonated Lignite and Phenolic Condensate

Physical mixtures of spray dried phenolic condensates and spray dried sulfonated lignite were prepared in a Patterson Kelly dry blender and used as drilling fluid additives in various salt water muds.

The effectiveness of Agent K in conjunction with sulfonated lignite was tested in the saturated salt water mud. The saturated salt water mud was prepared as follows:

To 350 cc of saturated salt water were added 28 grams Wyoming bentonite, 28 grams East Texas bentonite and 56 grams Grundite clay. The slurry was stirred for 1 hour, aged overnight at ambient temperature, and sheared with a high speed dispersator before use.

The saturated salt water mud was treated with individual components and an appropriate amount of sodium hydroxide and mud properties were recorded. The results of the study are shown in Table XXVI.

Table XXVI

|  | P.V. | Y.P. | API F.L. |
|---|---|---|---|
| Sat. Salt Water Mud | 7 | 20 | 90 |
| Agent K, 15 lb./bbl | 20 | 24 | 39.0 |
| Sulfonated Lignite, 15 lb/bbl | 15 | 17 | 45.0 |
| Agent K, 10 lb./bbl + Sulfonated Lignite, 5 lb./bbl(1) | 30 | 35 | 5.0 |
| Heat aged at 300°F. for 66 hours |  |  |  |
| Sat. Salt Water Mud | 14 | 30 | 110 |
| Agent K, 10 lb./bbl + Sulfonated Lignite, 5 lb/bbl (1) | 49 | 60 | 17.0 |

(1) A physical mixture of two components

As shown in Table XXVI, the mud treated with both ingredients shows a significant advantage in reducing fluid loss over the mud treated with single ingredient.

Agent K and sulfonated lignite were also tested in the saturated salt mud with variations of the ratio of two ingredients. The mud was treated with a physical mixture of two ingredients in which the ratio was varied. The property of unaged mud was recorded. Then the mud was heat aged at 250°F. for 16 hours and the property of aged mud was also recorded. The results are shown in Table XXVII.

Table XXVII

| TESTS | CONCT. LB/BBL | P.V. | Unaged Y.P. | F.L. | P.V. | Aged Y.P. | F.L. |
|---|---|---|---|---|---|---|---|
| Agent K | 10 | 23 | 20 | 6.1 | 18 | 40 | 7.0 |
| Sulfonated Lignite | 5 |  |  |  |  |  |  |
| Agent K | 8 | 15 | 22 | 4.6 | 21 | 66 | 11.4 |
| Sulfonated Lignite | 4 |  |  |  |  |  |  |
| Agent K | 6 | 18 | 20 | 18.5 | 18 | 46 | 14.5 |
| Base Mud |  | 11 | 22 | 65 | 11 | 35 | 80 |

The effectiveness of Agent K in conjunction with sulfonated lignite was also tested in the field sea water mud. The mud was treated with a spray dried Agent K, spray dried sulfonated lignite and an appropriate amount of sodium hydroxide. Preferably, the ratio of polymer (Agent K) to sulfonated lignite is between 1 to 10 and 10 to 1. The treated mud was heat aged at 250°F. for 16 hours and the properties were recorded.

The mud and the filtrate where then combined and heat aged at 350°F. for 16 hours. The mud properties were again measured. The results are compared with Additive 20 and Additive 46 in which Agent K and sulfonated lignite are complexed in accordance with the invention procedure in a ratio of 1:1. The results are shown in Table XXVIII.

Table XXVII

| TESTS | CONCT. LB/BBL | P.V. | 250°F. Y.P. | F.L. | P.V. | 350°F. Y.P. | F.L. |
|---|---|---|---|---|---|---|---|
| Agent K | 3 | 7 | 0 | 12.0 | 6 | 4 | 10.8 |
| Sulfonated Lignite | 7 |  |  |  |  |  |  |
| Agent K | 5 | 6 | 0 | 9.5 | 8 | 8 | 16.5 |
| Sulfonated Lignite | 5 |  |  |  |  |  |  |
| Additive 20 | 10 | 5 | 2 | 6.8 | 5 | 4 | 14.5 |
| Additive 46 | 10 | 6 | 0 | 7.5 | 8 | 4 | 15.2 |
| Base Mud | — | 4 | 7 | 64 | 4 | 9 | 110 |

OTHER DISPERSANTS AND PHENOLIC CONDENSATE

As indicated above, drilling mud dispersants other than sulfonated lignite can be substituted in whole or in part, for sulfonated lignite to prepare additives having the capability, when used in small but effective amounts, to reduce the fluid loss of the base mixture of water and clay solids. The amount of the dispersant (including sulfonated lignite) can vary over a broad range depending on the mud system and the condensate. Thus the weight ratio of dispersant to condensate can be in the range of 1:25 to 10:1, preferably 10:1 to 1:10 and still more preferably 5:1 to 1:5. In the most preferred composition, the ratio is about 1.5:1. The other dispersants, like the sulfonated lignite can be pre-reacted, before spray drying, with the condensate or merely physically mixed with the condensate, preferably prior to spray drying.

To demonstrate the effectiveness of other dispersants, the following additives were prepared:

| Additive | Dispersant | Agent | Dispersant to Agent Ratio* |
|---|---|---|---|
| 47 | Chrome lignosulfonate | H-5 | 1.5:1 |
| 48 | Chrome lignosulfonate | H-5 | 1.5:1 |
| 49 | Sulfonated hemlock bark extract | H-5 | 1.5:1 |

-continued

| Additive | Dispersant | Agent | Dispersant to Agent Ratio* |
|---|---|---|---|
| 50 | Sodium tetraphosphate | H-5 | 1.5:1 |

*By weight

All of these dispersants are sold on the open market as drilling mud thinners under such trademarks as Spersene, Rayflo and Magcophos, respectively.

Additives 47, 49 and 50 were prepared by mixing the dispersant and agent with water, adjusting the pH to 8.6 with sodium hydroxide, further diluting with water to a spray-dryable liquid and then spray drying. Additive 48 was made in the same manner except the liquid mixture of the chrome lignosulfonate and agent, after adjusting its pH to 8.6, was reacted for three hours at its refluxing temperature after adding paraformaldehyde in an amount of 16 weight percent of the chrome lignosulfonate solids.

The additives were tested in laboratory sea water mud weighted to 14 pounds per barrel with barite with the following results after heat aging for 16 hours at 300°F.

Table XXIX

| Tests | CONC LB/BBL | P.V. | Y.P. | F.L. |
|---|---|---|---|---|
| CLS* | 6 | 34 | 2 | 11.0 |
| Additive 47 | 4 | | | |
| CLS | 6 | 35 | 2 | 10.0 |
| Additive 48 | 4 | | | |
| Additive 47 | 10 | 49 | 20 | 7.6 |
| Additive 48 | 10 | 55 | 25 | 7.0 |
| SH** | 6 | 8 | 3 | 10 |
| Additive 49 | 4 | | | |
| STP*** | 6 | 7 | 17 | 18 |
| Additive 50 | 4 | | | |
| Base Mud | | 4 | 8 | 39 |

\* Chrome lignosulfonate
\*\* Sulfonated hemlock bark extract
\*\*\* Sodium Tetraphosphate From the foregoing description of the preparation of the sulfomethylated phenolic condensate, it can be seen that the formaldehyde, the phenolic material and the metal salt or salts of sulfurous acid are mixed together along with a small amount of water. Of course, the phenolic material is at least one of the group consisting of phenol, cresol, xylenol, resorcinol, tar acid and phenol bottoms. The resulting mixture is then heated to an elevated temperature sufficiently high that a chemical reaction is initiated. The initial reaction is highly exothermic and the initial water in the mixture should be as small as possible to avoid unduly diluting the reactants and yet large enough so that the initial exothermic reaction is controllable, e.g., enough water so that the exothermic reaction does not heat the reactants to a temperature exceeding 120° to 130°C. As the reaction proceeds, the reaction mixture tends to thicken and water is added to maintain the reaction mixture in a fluid condition at the reaction temperature. However, the amount added should not be enough to quench the reaction. Generally, the amount should be the minimum required to maintain the mixture pourable. The water can be added continuously or batchwise. After the initial exotherm, heat is supplied to maintain the reacting mixture at its reflux temperature. After the reaction has proceeded to the desired extent, it is quenched by adding sufficient water to lower the temperature of the mixture to a point where the reaction proceeds very slowly if at all, e.g., room temperature. The most desirable condensates are produced by permitting the reaction to proceed for a substantial time, e.g., 30 to 60 minutes, at the refluxing temperature. Since the optimum time will be dependent upon a number of factors such as the nature of the individual reactants, the reaction temperature, etc., it can be determined in each set of circumstances by routinely producing a series of condensates with differing reaction times (or other reaction conditions) and then testing them as additives (either alone or with a drilling mud dispersant as herein taught) to a particular mud system.

However, in any event, the reaction is quenched before a water insoluble condensate is obtained.

Having thus described the invention in detail, and with sufficient particularity as to enable those skilled in the art to practice it, what is desired to have protected by Letters Patent is set forth in the appended claims.

We claim:

1. A water base drilling, workover or completion fluid comprising a base mixture of water and clay solids to which has been added
   a water soluble additive, said additive being the sulfomethylated condensate reaction product of phenolic material, a water soluble salt or salts of sulfurous acid and formaldehyde, said phenolic material being selected from the group consisting of at least one of phenol, cresol, xylenol, tar acid and "phenol bottoms"; said additive being present in a small but effective amount sufficient to reduce the fluid loss of said base mixture.

2. A water base drilling, workover or completion fluid comprising a base mixture of water and clay solids, and a fluid loss control additive in a small but effective amount sufficient to reduce the fluid loss of said base mixture, said additive comprising a sulfomethylated phenolic material and being the reaction product of (i) a phenolic material of at least one of the group consisting of phenol, cresol, xylenol, tar acid and "phenol bottoms",
   (ii) formaldehyde in an amount of 1 to 6 mols per mol of said phenolic material and (iii) a water soluble salt or salts of sulfurous acid in an amount of 0.25 to 0.75 mols per mol of said phenolic material, the reaction of such reactants being terminated before it has proceeded to the point that the reaction product becomes insoluble in water.

3. The fluid of claim 2 wherein said salts of sulfurous acid comprise alkali metal sulfite and bisulfite.

4. The fluid of claim 2 wherein said phenolic material is phenol.

5. The fluid of claim 4 wherein the amount of formaldehyde is in the range of 1 to 3 mols per mol of phenolic material.

6. The fluid of claim 2 wherein said reaction product also includes as item (iv) from 0.1 to 3 mols per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the item (iv) material being added during the formation of said reaction product after said phenolic material, said salt or salts and said formaldehyde have been at least partially reacted.

7. The fluid of claim 6 wherein said item (iv) is urea.

8. The fluid of claim 6 wherein said item (iv) is salicylic acid.

9. A water base drilling, workover or completion fluid comprising a base mixture of water and clay solids, and a fluid loss control additive in a small but effective amount sufficient to reduce the fluid loss of said base mixture, said additive comprising a sulfomethylated phenolic material and being the reaction product of (i) a phenolic material of at least one of the group consisting of phenol, cresol, xylenol, and tar acid, (ii) formaldehyde in an amount of 1 to 3 mols per mol of said phenolic material and (iii) a water soluble salt or salts of sulfurous acid in an amount of about 0.5 mol per mol of said phenolic material, the reaction of such reactants being terminated before it has proceeded to the point that the reaction product becomes insoluble in water.

10. The fluid of claim 9 wherein said salts of sulfurous acid comprise alkali metal sulfite and bisulfite.

11. The fluid of claim 9 wherein said phenolic material is phenol.

12. The fluid of claim 9 wherein said reaction product also includes as item (iv) a small amount but less than 1 mol per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the item (iv) material being added during the formation of said reaction product after said phenolic material, said salt or salts and said formaldehyde have been at least partially reacted.

13. The fluid of claim 12 wherein said item (iv) is urea.

14. The fluid of claim 12 wherein said item (iv) is salicylic acid.

15. The fluid of claim 9 wherein the additive includes a dispersant for the clay solids in the fluid, said dispersant being selected from the group consisting of (i) sulfonated lignite and (ii) an oxidized salt of a sulfonated lignin material wherein the salt has at least one cation selected from the group consisting of iron, chromium, copper and aluminum.

16. A water base drilling, workover or completion fluid comprising a base mixture of water and clay solids, and a fluid loss control additive in a small but effective amount sufficient to reduce the fluid loss of said base mixture, said additive comprising a sulfomethylated phenolic material and being the reaction product of (i) a phenolic material of at least one of the group consisting of phenol, cresol, xylenol, and tar acid, (ii) formaldehyde in an amount of 1 to 3 mols per mol of said phenolic material, (iii) a water soluble salt or salts of sulfurous acid in an amount of 0.1 to 2 mols per mol of said phenolic material, and (iv) a small amount but less than 1 mol per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the reaction of such reactants being terminated before it has proceeded to the point that the reaction product becomes insoluble in water and item (iv) being added during the reaction of items (i), (ii) and (iii) after said items (i), (ii) and (iii) have been at least partially reacted, and water soluble sulfonated lignite in amount of from 10:1 to 1:10 weight ratio of said lignite to said reaction product.

17. The fluid of claim 16 wherein said salts of sulfurous acid comprise a mixture of alkali metal sulfite and bisulfite.

18. The fluid of claim 16 wherein said phenolic material is phenol.

19. The fluid of claim 18 wherein item (iv) is urea.

20. The fluid of claim 18 wherein said item (iv) is salicylic acid.

21. A composition of matter for use as an additive to a water base drilling, workover or completion fluid to reduce the fluid loss of such fluid comprising a drilling mud dispersant and a sulfomethylated phenolic material which is the reaction product of (i) a phenolic material of at least one of the group consisting of phenol, cresol, xylenol, tar acid and "phenol bottoms", (ii) formaldehyde in an amount of 1 to 6 mols per mol of said phenolic material and (iii) a water soluble salt or salts of sulfurous acid in an amount of 0.25 to 0.75 mols per mol of said phenolic material, the reaction of such reactants being terminated before it has proceeded to the point that the reaction product becomes insoluble in water; said dispersant being selected from the group consisting of (i) sulfonated lignite and (ii) an oxidized salt of a sulfonated lignin material wherein the salt has at least one cation selected from the group consisting of iron, chromium, copper and aluminum, the weight ratio of the dispersant to the reaction product being in the range of 10:1 to 1:10.

22. The composition of claim 21 wherein said salts of sulfurous acid comprise alkali metal sulfite and bisulfite.

23. The composition of claim 21 wherein said phenolic material is phenol.

24. The composition of claim 23 wherein the amount of formaldehyde is in the range of 1 to 3 mols per mol of phenolic material.

25. The composition of claim 21 wherein said reaction product also includes as item (iv) from 0.1 to 3 mols per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the item (iv) material being added during the formation of said reaction product after said phenolic material, said salt or salts and said formaldehyde have been at least partially reacted.

26. The composition of claim 25 wherein said item (iv) is urea.

27. The composition of claim 25 wherein said item (iv) is salicylic acid.

28. A composition of matter for use as an additive to a water base drilling, workover or completion fluid to reduce the fluid loss of such fluid comprising a drilling mud dispersant and a sulfomethylated phenolic material which is the reaction product of (i) a phenolic material of at least one of the group consisting of phenol, cresol, xylenol, and tar acid, (ii) formaldehyde in an amount of 1 to 3 mols per mol of said phenolic material and (iii) a water soluble salt or salts of sulfurous acid in an amount of about 0.5 mol per mol of said phenolic material, the reaction of such reactants being terminated before it has proceeded to the point that the reaction product becomes insoluble in water; said dispersant being selected from the group consisting of (i) sulfonated lignite and (ii) an oxidized salt of a sulfonated lignin material wherein the salt has at least one cation selected from the group consisting of iron, chromium, copper and aluminum, the weight ratio of the dispersant to the reaction product being in the range of 10:1 to 1:10.

29. The composition of claim 28 wherein said salts of sulfurous acid comprise alkali metal sulfite and bisulfite.

30. The composition of claim 28 wherein said phenolic material is phenol.

31. The composition of claim 28 wherein said reaction product also includes as item (iv) a small amount but less than 1 mol per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the item (iv) material being added during the formation of said reaction product after said phenolic material, said salt or salts and said formaldehyde have been at least partially reacted.

32. The composition of claim 31 wherein said item (iv) is urea.

33. The composition of claim 31 wherein said item (iv) is salicylic acid.

34. A composition of matter for use as an additive to a water base drilling, workover or completion fluid to reduce the fluid loss of such fluid comprising water soluble sulfonated lignite and a sulfomethylated phenolic material which is the reaction product of (i) a phenolic material of at least one of the group consisting of phenol, cresol, xylenol, and tar acid, (ii) formaldehyde in an amount of 1 to 3 mols per mol of said phenolic material, (iii) a water soluble salt or salts of sulfurous acid in an amount of 0.1 to 2 mols per mol of said phenolic material, and (iv) a small amount but less than 1 mol per mol of said phenolic material of at least one material selected from the group consisting of urea, melamine, salicylic acid, benzoic acid, phthalic acid, adipic acid, succinic acid, glutaric acid, maleic acid or the corresponding anhydrides of such acids, the reaction of such reactants being terminated before it has proceeded to the point that the reaction product becomes insoluble in water and item (iv) being added during the reaction of items (i), (ii) and (iii) after said items (i), (ii) and (iii) have been at least partially reacted; the lignite being in an amount of from 10:1 to 1:10 weight ratio of said lignite to said reaction product.

35. The composition of claim 34 wherein said salts of sulfurous acid comprise a mixture of alkali metal sulfite and bisulfite.

36. The composition of claim 34 wherein said phenolic material is phenol.

37. In a process of drilling a well which comprises the steps of performing a drilling operation in the well with a tool for performing such operation and circulating a fluid in the well while performing such an operation, the improvement comprising circulating in said well the fluid of claim 1.

38. In a process of drilling a well which comprises the steps of performing a drilling operation in the well with a tool for performing such operation and circulating a fluid in the well while performing such an operation, the improvement comprising circulating in said well the fluid of claim 2.

39. In a process of drilling a well which comprises the steps of performing a drilling operation in the well with a tool for performing such operation and circulating a fluid in the well while performing such an operation, the improvement comprising circulating in said well the fluid of claim 3.

40. In a process of drilling a well which comprises the steps of performing a drilling operation in the well with a tool for performing such operation and circulating a fluid in the well while performing such an operation, the improvement comprising circulating in said well the fluid of claim 4.

41. In a process of drilling a well which comprises the steps of performing a drilling operation in the well with a tool for performing such operation and circulating a fluid in the well while performing such an operation, the improvement comprising circulating in said well the fluid of claim 5.

42. In a process of drilling a well which comprises the steps of performing a drilling operation in the well with a tool for performing such operation and circulating a fluid in the well while performing such an operation, the improvement comprising circulating in said well the fluid of claim 6.

43. In a process of drilling a well which comprises the steps of performing a drilling operation in the well with a tool for performing such operation and circulating a fluid in the well while performing such an operation, the improvement comprising circulating in said well the fluid of claim 7.

44. In a process of drilling a well which comprises the steps of performing a drilling operation in the well with a tool for performing such operation and circulating a fluid in the well while performing such an operation, the improvement comprising circulating in said well the fluid of claim 8.

45. In a process of drilling a well which comprises the steps of performing a drilling operation in the well with a tool for performing such operation and circulating a fluid in the well while performing such an operation, the improvement comprising circulating in said well the fluid of claim 9.

46. In a process of drilling a well which comprises the steps of performing a drilling operation in the well with a tool for performing such operation and circulating a fluid in the well while performing such an operation, the improvement comprising circulating in said well the fluid of claim 10.

47. In a process of drilling a well which comprises the steps of performing a drilling operation in the well with a tool for performing such operation and circulating a fluid in the well while performing such an operation, the improvement comprising circulating in said well the fluid of claim 11.

48. In a process of drilling a well which comprises the steps of performing a drilling operation in the well with a tool for performing such operation and circulating a fluid in the well while performing such an operation, the improvement comprising circulating in said well the fluid of claim 12.

49. In a process of drilling a well which comprises the steps of performing a drilling operation in the well with a tool for performing such operation and circulating a fluid in the well while performing such an operation, the improvement comprising circulating in said well the fluid of claim 13.

50. In a process of drilling a well which comprises the steps of performing a drilling operation in the well with a tool for performing such operation and circulating a fluid in the well while performing such an operation, the improvement comprising circulating in said well the fluid of claim 14.

51. In a process of drilling a well which comprises the steps of performing a drilling operation in the well with a tool for performing such operation and circulating a fluid in the well while performing such an operation, the improvement comprising circulating in said well the fluid of claim 15.

52. In a process of drilling a well which comprises the steps of performing a drilling operation in the well with a tool for performing such operation and circulating a fluid in the well while performing such an operation, the improvement comprising circulating in said well the fluid of claim 16.

53. In a process of drilling a well which comprises the steps of performing a drilling operation in the well with a tool for performing such operation and circulating a fluid in the well while performing such an operation, the improvement comprising circulating in said well the fluid of claim 17.

54. In a process of drilling a well which comprises the steps of performing a drilling operation in the well with a tool for performing such operation and circulating a fluid in the well while performing such an operation, the improvement comprising circulating in said well the fluid of claim 18.

55. In a process of drilling a well which comprises the steps of performing a drilling operation in the well with a tool for performing such operation and circulating a fluid in the well while performing such an operation, the improvement comprsing circulating in said well the fluid of claim 19.

56. In a process of drilling a well which comprises the steps of performing a drilling operation in the well with a tool for performing such operation and circulating a fluid in the well while performing such an operation, the improvement comprising circulating in said well the fluid of claim 20.

* * * * *